US012505938B2

(12) United States Patent
Mayama

(10) Patent No.: US 12,505,938 B2
(45) Date of Patent: *Dec. 23, 2025

(54) THICK ELECTRIC WIRE

(71) Applicant: SUMITOMO ELECTRIC INDUSTRIES, LTD., Osaka (JP)

(72) Inventor: Yuhei Mayama, Tochigi (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 171 days.

This patent is subject to a terminal disclaimer.

(21) Appl. No.: 18/536,902

(22) Filed: Dec. 12, 2023

(65) Prior Publication Data

US 2024/0120132 A1 Apr. 11, 2024

Related U.S. Application Data

(63) Continuation-in-part of application No. 18/048,526, filed on Oct. 21, 2022, now Pat. No. 11,887,756.

(30) Foreign Application Priority Data

Nov. 5, 2021 (JP) ................................ 2021-181499

(51) Int. Cl.
*H01B 9/00* (2006.01)
*B60R 16/02* (2006.01)
*H01B 3/44* (2006.01)

(52) U.S. Cl.
CPC ........... *H01B 9/00* (2013.01); *B60R 16/0207* (2013.01); *H01B 3/441* (2013.01)

(58) Field of Classification Search
None
See application file for complete search history.

(56) References Cited

U.S. PATENT DOCUMENTS

| | | | | | |
|---|---|---|---|---|---|
| 883,759 | A * | 4/1908 | Tangring | D07B 1/0673 | 174/128.1 |
| 1,691,869 | A * | 11/1928 | Fowle | H01B 5/08 | 174/128.1 |
| 1,727,971 | A * | 9/1929 | Stearns | H01B 11/00 | 57/210 |
| 2,978,530 | A * | 4/1961 | Braeckman | H01B 13/02 | 174/128.1 |
| 3,366,728 | A * | 1/1968 | Garwin | H10N 60/20 | 174/128.1 |

(Continued)

FOREIGN PATENT DOCUMENTS

| | | |
|---|---|---|
| JP | 2009-127040 | 6/2009 |
| JP | 2014-139932 | 7/2014 |
| JP | 2018-063935 | 4/2018 |

*Primary Examiner* — Krystal Robinson
(74) *Attorney, Agent, or Firm* — IPUSA, PLLC

(57) ABSTRACT

An electric wire for use in an electric vehicle with a large current of 100 A or more and a high voltage of 30 V or more includes a conductor and an electrically insulating layer covering an outer surface of the conductor, wherein the conductor includes first twisted wires in each of which a plurality of element wires are twisted together, and the first twisted wires are twisted together to form one or more second twisted wires, wherein an element-wire diameter of each of the element wires is 0.18 mm to 0.35 mm, and wherein a secant modulus of the electrically insulating layer is 15 MPa to 41 MPa.

5 Claims, 4 Drawing Sheets

(56) References Cited

U.S. PATENT DOCUMENTS

| | | | | | |
|---|---|---|---|---|---|
| 3,509,269 | A * | 4/1970 | Elliott | H01B 7/28 162/138 |
| 3,772,454 | A * | 11/1973 | Donecker | H01B 7/226 174/128.1 |
| 4,315,099 | A * | 2/1982 | Gerardot | E21B 17/20 57/220 |
| 4,538,023 | A * | 8/1985 | Brisson | H01B 11/12 174/113 A |
| 5,600,097 | A * | 2/1997 | Bleich | H01B 7/295 174/121 A |
| 5,760,341 | A * | 6/1998 | Laske | H01B 7/0009 174/128.1 |
| 8,039,749 | B2 * | 10/2011 | Okano | H01B 11/1008 174/113 R |
| 2009/0133926 | A1 | 5/2009 | Kambe | |
| 2014/0030520 | A1 * | 1/2014 | Nakamura | H01B 7/295 524/436 |
| 2014/0367141 | A1 | 12/2014 | Tozawa et al. | |
| 2019/0172606 | A1 * | 6/2019 | Kohori | H01B 7/1875 |

* cited by examiner

THICK ELECTRIC WIRE

CROSS REFERENCE TO RELATED APPLICATIONS

This application is a continuation-in-part of application Ser. No. 18/048,526, filed on Oct. 21, 2022, which is based on and claims priority to Japanese Patent Application No. 2021-181499 filed on Nov. 5, 2021. The entire contents of both application Ser. No. 18/048,526 and Japanese Patent Application No. 2021-181499 are incorporated herein by reference.

TECHNICAL FIELD

The present disclosure relates to thick electric wires.

BACKGROUND ART

PTL1 discloses an insulated wire comprising a conductor and an insulator covering the conductor, wherein the insulator is composed of a halogen-free resin composition.

PTL1: Japanese Unexamined Patent Application Publication No. 2009-127040

SUMMARY OF INVENTION

An electric wire for use in an electric vehicle with a large current of 100 A or more and a high voltage of 30 V or more includes a conductor and an electrically insulating layer covering an outer surface of the conductor, wherein the conductor includes first twisted wires in each of which a plurality of element wires are twisted together, and the first twisted wires are twisted together to form one or more second twisted wires, wherein an element-wire diameter of each of the element wires is 0.18 mm to 0.35 mm, and wherein a secant modulus of the electrically insulating layer is 15 MPa to 41 MPa.

DESCRIPTION OF EMBODIMENTS

Figure 1:
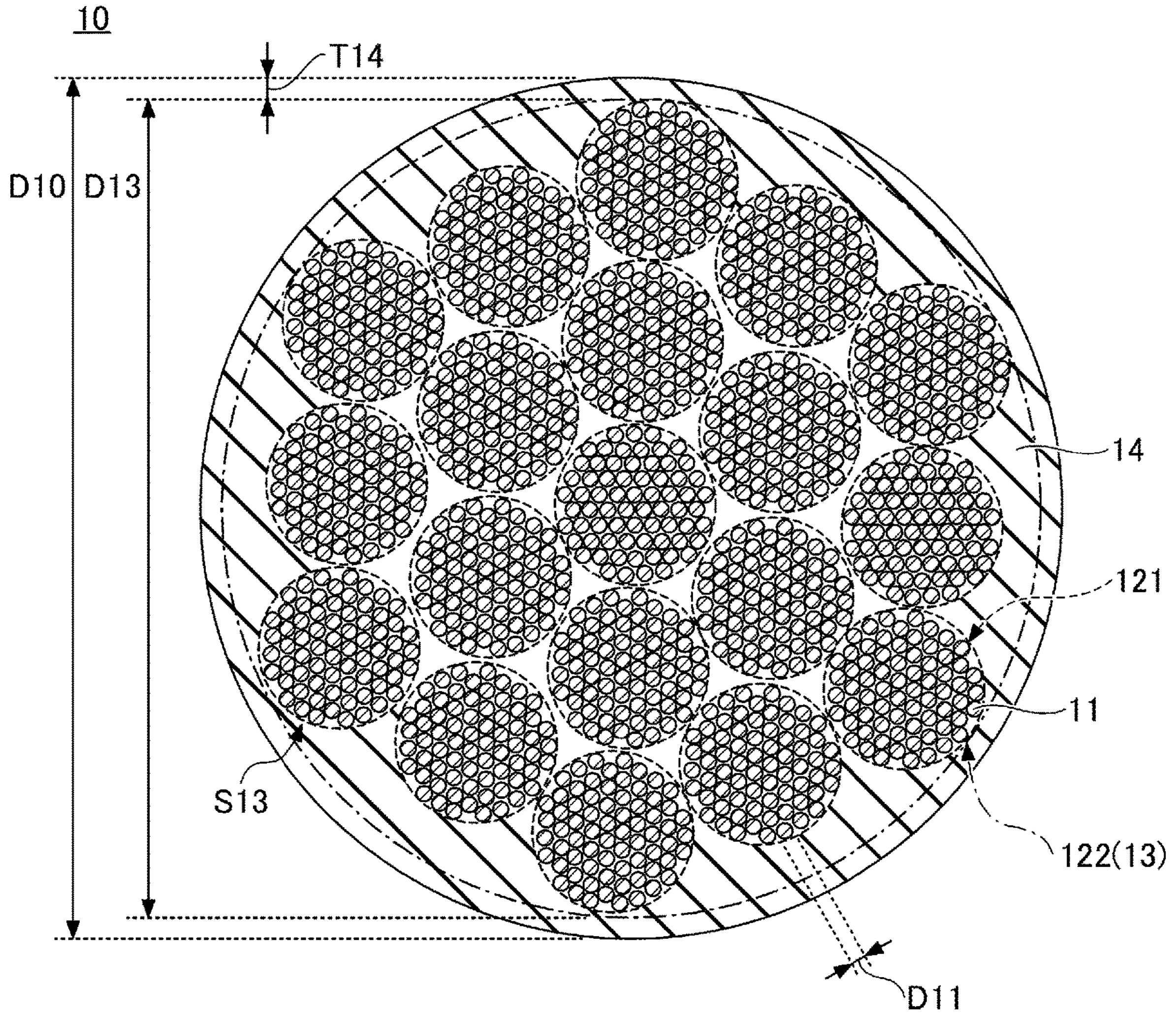
FIG. 1 is a cross-sectional view in a plane perpendicular to the longitudinal direction of a thick electric wire according to an embodiment of the present disclosure.

As disclosed in PTL1, insulated electric wires have been conventionally used for wirings of a vehicle and the like. In recent years, electric vehicles and the like have been developed and put into practical use from the viewpoint of reducing environmental load. From the viewpoint of shortening the charging time and the like, an electric wire including a conductor having a large cross-sectional area is also used so as to cope with a large current and a high voltage.

However, an electric wire including a conductor having a large cross-sectional area is hard and difficult to bend. For this reason, there has been a problem that workability is lowered when the electric wire is attached to an electric vehicle. Therefore, there has been a demand for an electric wire for an electric vehicle having excellent flexibility and a large cross-sectional area that can be easily bent when the electric wire is attached to the electric vehicle.

An object of the present disclosure is to provide a thick electric wire having excellent flexibility.

Embodiments of the present invention will be described below.

Description of Embodiments of Present Disclosure

First, embodiments of the present disclosure will be listed and described. In the following description, the same or corresponding elements are denoted by the same reference numerals, and the same description thereof will not be repeated.

(1) A thick electric wire according to an aspect of the present disclosure includes a conductor, and an electrically insulating layer covering an outer surface of the conductor, the thick electric wire being configured to be used for large current of 100 A or more and a high voltage of 30 V or more. The conductor includes first twisted wires in each of which a plurality of element wires are twisted together, and the first twisted wires are twisted together to form one or more second twisted wires. A element-wire diameter of each of the element wires is 0.18 mm to 0.35 mm. A secant modulus of the electrically insulating layer is 15 MPa to 41 MPa.

Since the conductor includes first twisted wires in each of which a plurality of element wires are twisted together, and the first twisted wires are twisted together to form one or more second twisted wires, the flexibility of the conductor including the first twisted wires as the second twisted wire and the flexibility the thick electric wire including the conductor can be particularly enhanced. In addition, even when the number of element wires is large, it is possible to improve the handleability of the element wires and improve the productivity of the conductor by twisting the element wires in multiple stages.

By setting the element-wire diameter of the element wire included in the conductor to 0.35 mm or less, the element-wire diameter of each element wire constituting the conductor is made sufficiently small, so that the flexibility of the conductor in which element wires are twisted together and the thick electric wire including the conductor can be enhanced.

By setting the element-wire diameter of the element wire included in the conductor to 0.18 mm or more, the number of element wires constituting the conductor is reduced, so that the producibility of the thick electric wire can be increased, and the cost can be suppressed.

By setting the secant modulus of the electrically insulating layer to 41 MPa or less, the flexibility of the electrically insulating layer and the thick electric wire including the electrically insulating layer can be enhanced.

In addition, by setting the secant modulus of the electrically insulating layer to 15 MPa or more, the adhesion of the electrically insulating layer to the conductor is prevented from becoming excessively high. It is thus possible to enhance the flexibility of the thick electric wire, and to enhance the workability at the time of attaching the thick electric wire to the vehicle body of a vehicle or the like.

(2) The conductor may have a nominal cross-sectional area of 70 SQ. A repulsive force exerted by the thick electric wire may be 55 N or less when the thick electric wire is bent at a bent portion and when a radius of curvature of the bent portion is changed from 100 mm to 50 mm. A conductor adhesive force may be 50 N or less, the conductor adhesive force being an adhesive force between the conductor and the electrically insulating layer.

By setting the nominal cross-sectional area of the conductor as 70 SQ, the thick electric wire including the conductor having a particularly large cross-sectional area is obtained, so that the thick electric wire can cope with a large current and a high voltage.

The fact that the repulsive force is in the above range, together with the given nominal cross-sectional area of the conductor, means that flexibility is excellent when the thick electric wire is bent. When the conductor adhesive force is also adequate, thus, the thick electric wire is particularly excellent in flexibility, and can also provide enhanced workability at the time of attachment to the vehicle body of a vehicle or the like. In addition, when the conductor adhesive force is in the above range, the adhesion between the conductor and the electrically insulating layer is appropriate. Such a conductor adhesive force, together with the above-noted repulsive force, provides the thick electric wire that is excellent in skin-peeling workability in addition to flexibility, thereby providing enhanced workability at the time of being attached to the vehicle body of a vehicle.

(3) The conductor may have a nominal cross-sectional area of 95 SQ. A repulsive force exerted by the thick electric wire may be 70 N or less when the thick electric wire is bent at a bent portion and when a radius of curvature of the bent portion is changed from 100 mm to 50 mm. A conductor adhesive force may be 50 N or less, the conductor adhesive force being an adhesive force between the conductor and the electrically insulating layer.

By setting the nominal cross-sectional area of the conductor as 95 SQ, the thick electric wire including the conductor having a particularly large cross-sectional area is obtained, so that the thick electric wire can cope with a large current and a high voltage.

The fact that the repulsive force is in the above range, together with the given nominal cross-sectional area of the conductor, means that flexibility is excellent when the thick electric wire is bent. When the conductor adhesive force is also adequate, thus, the thick electric wire is particularly excellent in flexibility, and can also provide enhanced workability at the time of attachment to the vehicle body of a vehicle or the like. In addition, when the conductor adhesive force is in the above range, the adhesion between the conductor and the electrically insulating layer is appropriate. Such a conductor adhesive force, together with the above repulsive force provides the thick electric wire that is excellent in skin-peeling workability in addition to flexibility, thereby providing enhanced workability at the time of being attached to the vehicle body of a vehicle.

(4) The conductor may have a nominal cross-sectional area of 120 SQ. A repulsive force exerted by the thick electric wire may be 140 N or less when the thick electric wire is bent at a bent portion and when a radius of curvature of the bent portion is changed from 100 mm to 50 mm. A conductor adhesive force may be 50 N or less, the conductor adhesive force being an adhesive force between the conductor and the electrically insulating layer.

By setting the nominal cross-sectional area of the conductor as 120 SQ, the thick electric wire including the conductor having a particularly large cross-sectional area is obtained, so that the thick electric wire can cope with a large current and a high voltage.

The fact that the repulsive force is in the above range, together with the given nominal cross-sectional area of the conductor, means that flexibility is excellent when the thick electric wire is bent. When the conductor adhesive force is also adequate, thus, the thick electric wire is particularly excellent in flexibility, and can also provide enhanced workability at the time of attachment to the vehicle body of a vehicle or the like. In addition, when the conductor adhesive force is in the above range, the adhesion between the conductor and the electrically insulating layer is appropriate. Such a conductor adhesive force, together with the above repulsive force, provides the thick electric wire that is excellent in skin-peeling workability in addition to flexibility, thereby providing enhanced workability at the time of being attached to the vehicle body of a vehicle.

(5) The conductor may include a third twisted wire in which a plurality of the second twisted wires are twisted together.

Since the conductor has the third twisted wire in which the plurality of the second twisted wires are twisted together, appropriate spaces are formed between the element wires and between the twisted wires, and the flexibility of the conductor including the first twisted wires forming the second twisted wires and the third twisted wire as well as the thick electric wire including the conductor can be particularly enhanced. In addition, even when the number of element wires is large, it is possible to improve the handleability of the element wires and improve the productivity of the conductor by twisting the element wires in multiple stages.

(6) The electrically insulating layer may contain an insulating resin. The insulating resin may include an ethylene-ethylacrylate copolymer.

Since the insulating resin of the electrically insulating layer contains ethylene-ethylacrylate copolymer (EEA), the heat resistance and flame retardancy of the electrically insulating layer and the thick electric wire including the electrically insulating layer can be particularly enhanced.

(7) The ethylene-ethylacrylate copolymer may include more than 10 mass % and less than 35 mass % of ethylacrylate.

When the ethylene-ethylacrylate copolymer (EEA) contains more than 10 mass % of ethylacrylate (EA), the flexibility of the electrically insulating layer or the thick electric wire including the electrically insulating layer can be enhanced. When the ethylene-ethylacrylate copolymer (EEA) contains less than 35 mass % of ethylacrylate (EA), it is possible to prevent the electrically insulating layer from becoming excessively flexible and the adhesion to the conductor from increasing. Therefore, when the ethylene-ethylacrylate copolymer (EEA) contains less than 35 mass % of ethylacrylate (EA), the flexibility of the thick electric wire can be enhanced.

(8) The insulating resin contains a polyethylene resin, and, when a total content of the ethylene-ethylacrylate copolymer and the polyethylene resin is 100 mass %, a content of the ethylene-ethylacrylate copolymer may be more than 20 mass % and less than 90 mass %.

When the insulating resin contains the polyethylene resin, the flexibility of the electrically insulating layer or the thick electric wire including the electrically insulating layer can be particularly enhanced.

When the proportion of the ethylene-ethylacrylate copolymer is more than 20 mass %, the heat resistance and flame retardancy of the electrically insulating layer and the thick electric wire including the electrically insulating layer can be enhanced. In addition, when the proportion of the ethylene-ethylacrylate copolymer is less than 90 mass %, the flexibility of the electrically insulating layer can be made appropriate, and the flexibility of the thick electric wire can be enhanced.

Details of Embodiments of Present Disclosure

An example of a thick electric wire according to an embodiment of the present disclosure will now be described with reference to the accompanying drawings. Note that the present invention is not limited to these examples, but is defined by the claims, and is intended to include all modifications within the meaning and range equivalent to the claims.

Thick Electric Wire

Figure 2:
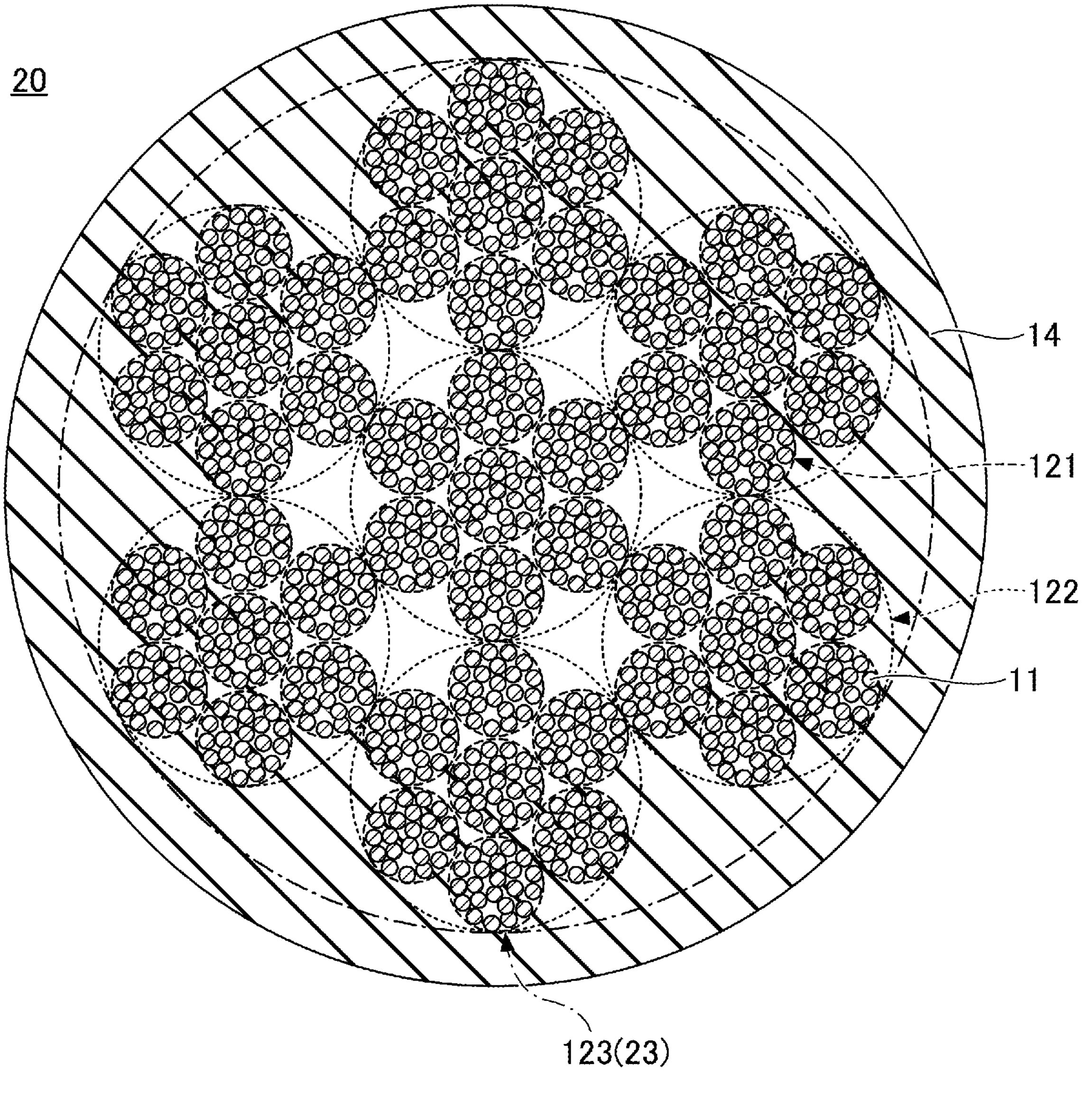
FIG. 2 is a cross-sectional view in a plane perpendicular to the longitudinal direction of a thick electric wire according to an embodiment of the present disclosure.
Figure 3:
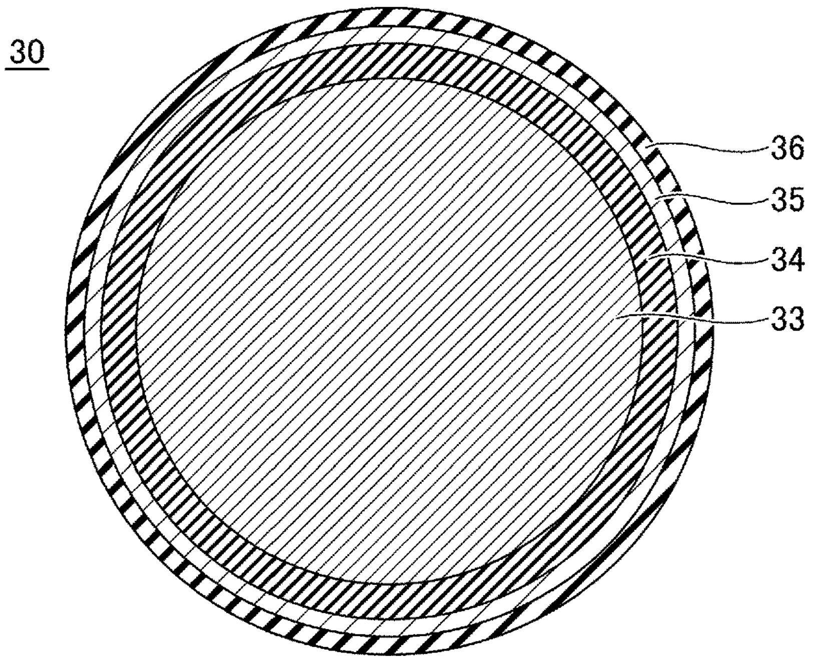
FIG. 3 is a cross-sectional view in a plane perpendicular to the longitudinal direction of a thick electric wire with a shield layer and an outer periphery covering, according to an embodiment of the present disclosure.

FIGS. 1 to 3 show configuration examples of a cross section perpendicular to the longitudinal direction of a thick electric wire of the embodiment of the present disclosure. The direction perpendicular to the paper surface in. FIGS. 1 to 3 is the longitudinal direction of the thick electric wire. A thick electric wire 20 shown in FIG. 2 can have the same configuration as a thick electric wire 10 shown in FIG. 1 except that the configuration of a conductor 23 is different. A thick electric wire 30 shown in FIG. 3 can have the same configuration as the thick electric wire shown in FIGS. 1 and 2 except that thick electric wire 30 has a shield layer and an outer periphery covering. Therefore, thick electric wire 10 shown in FIG. 1 will be mainly used for description, and FIGS. 2 and 3 will be used as needed for description.

As shown in FIG. 1, thick electric wire 10 of embodiment of the present disclosure can include a conductor 13 and an electrically insulating layer 14 covering an outer surface of conductor 13.

(1) Each Member Contained in Thick Electric Wire

Each member contained in the thick electric wire of the embodiment of the present disclosure will be described.

(1-1) Conductor (1-1-1) Nominal Cross-Sectional Area

A nominal cross-sectional area S13 of conductor 13 can be, for example, from 70 SQ (70 $mm^2$) to 120 SQ ($mm^2$). The thick electric wire of the embodiment of the present disclosure is an electric wire including conductor 13 having a nominal cross-sectional area in the above range.

By setting nominal cross-sectional area S13 of conductor 13 to 70 SQ (70 $mm^2$) or more and 120 SQ ($mm^2$) or less, a thick electric wire including a conductor having a particularly large cross-sectional area can be obtained, and a thick electric wire for an electric vehicle used for a large current and a high voltage can be obtained. As described above, for example, conductor 13 having a nominal cross-sectional area in the above range can be selected and applied to the thick electric wire of the embodiment of the present disclosure. For example, the conductor having a nominal cross-sectional area of any one of 70 SQ, 95 SQ, and 120 SQ can be selected and applied to the thick electric wire of the embodiment of the present disclosure.

When conductor 13 is constituted by a plurality of element wires, nominal cross-sectional area S13 is the total cross-sectional area of element wires, and can be calculated by the product of the element wire cross-sectional area and the number of element wires. The nominal cross-sectional area S13 may also be referred to as a calculated cross-sectional area.

The conductor in which nominal cross-sectional area S13 is 70 SQ does not mean that the total cross-sectional area of element wires is strictly 70 $mm^2$, and includes a case in which the total cross-sectional area of element wires is from 66.6 $mm^2$ to 71.9 $mm^2$. That is, the conductor in which nominal cross-sectional area S13 is 70 SQ refers to a conductor that is commercially distributed as having a 70-SQ total cross-sectional area of element wires (conductor cross-sectional area).

The conductor in which nominal cross-sectional area S13 is 95 SQ does not mean that the total cross-sectional area of element wires is strictly 95 $mm^2$, and includes a case in which the total cross-sectional area of element wires is from 88.0 $mm^2$ to 95.4 $mm^2$. That is, the conductor in which nominal cross-sectional area S13 is 95 SQ refers to a conductor that is commercially distributed as having a 95-SQ total cross-sectional area of element wires (conductor cross-sectional area).

The conductor in which nominal cross-sectional area S13 is 120 SQ does not mean that the total cross-sectional area of element wires is strictly 120 $mm^2$, and includes a case in which the total cross-sectional area of element wires is from 113 $mm^2$ to 122 $mm^2$. That is, the conductor in which nominal cross-sectional area S13 is 120 SQ refers to a conductor that is commercially distributed as having a 120-SQ total cross-sectional area of element wires (conductor cross-sectional area).

(1-1-2) Configuration of Conductor

The material of conductor 13 is not limited to a particular material. For example, one or more conductor materials selected from copper, annealed copper, silver, nickel-plated annealed copper, and tin-plated annealed copper can be used.

Conductor 13 can be formed of the twisted wire in which a single wire or a plurality of element wires are twisted together. In particular, from the viewpoint of enhancing the flexibility of the thick electric wire, for example, as shown in FIG. 1, conductor 13 may be a twisted wire in which a plurality of element wires 11 are twisted together. Hereinafter, a configuration example in which conductor 13 is a twisted wire will be described.

<Element-Wire Diameter>

When conductor 13 is a twisted wire in which a plurality of element wires are twisted together, an element-wire diameter D11 of element wire 11 may be from 0.18 mm to 0.35 mm. It may be from 0.20 mm to 0.32 mm.

By setting element-wire diameter D11 of element wire 11 included in conductor 13 to 0.35 mm or less, element-wire diameter D11 of each element wire 11 constituting conductor 13 can be sufficiently suppressed, and the flexibility of conductor 13 in which element wires 11 are twisted together and thick electric wire 10 including conductor 13 can be enhanced.

However, when element-wire diameter D11 of element wire 11 included in conductor 13 is excessively reduced, the number of element wires 11 constituting conductor 13 is significantly increased, which causes a decrease in productivity and an increase in cost. In addition, even if element-wire diameter D11 is excessively reduced, the influence on the flexibility of conductor 13 and thick electric wire 10 including conductor 13 is reduced. Therefore, by setting element-wire diameter D11 of element wire 11 included in conductor 13 to 0.18 mm or more, the number of element wires constituting conductor 13 can be suppressed, the producibility of the thick electric wire can be increased, and the cost can be suppressed.

<Configuration of Twisted Wire>

When conductor 13 is a twisted wire in which plurality of element wires 11 are twisted together, the plurality of element wires may be twisted in multiple stages from the viewpoint of productivity or the like.

That is, as shown in FIG. 1, conductor 13 may include a first twisted wire 121 in which plurality of element wires 11 are twisted together and a second twisted wire 122 in which plurality of first twisted wires 121 are twisted together.

Since conductor 13 includes first twisted wire 121 in which plurality of element wires 11 are twisted together, and second twisted wire 122 in which plurality of first twisted wires 121 are twisted together, the flexibility of conductor 13 including first twisted wire 121 and second twisted wire 122 or thick electric wire 10 including conductor 13 can be particularly enhanced. In addition, even when the number of element wires 11 is large, it is possible to improve the handleability of element wires 11 and improve the productivity of conductor 13 by twisting element wires 11 in multiple stages.

In the case of thick electric wire 10 shown in FIG. 1, 69 element wires 11 are twisted in each first twisted wire 121, and 19 first twisted wires 121 are twisted in second twisted wire 122. In the case of thick electric wire 10 shown in FIG. 1, second twisted wire 122 serves as conductor 13.

However, the number of element wires constituting first twisted wire 121 and the number of first twisted wires 121 constituting second twisted wire 122 are not limited to the above example, and may be any number. For example, the number of element wires 11 constituting first twisted wire 121 may be from 20 to 150. The number may be from 23 to 120. By setting the number of element wires 11 constituting first twisted wire 121 to 20 or more, it is possible to suppress the number of first twisted wires 121 included in conductor 13 and to increase the productivity when manufacturing conductor 13. In addition, by setting the number of element wires 11 constituting first twisted wire 121 to 150 or less, it is possible to increase productivity when manufacturing first twisted wire 121.

For example, the number of first twisted wires 121 constituting second twisted wire 122 may be from 5 to 50. The number may be from 7 to 40. By setting the number of first twisted wires 121 constituting second twisted wire 122 to 5 or more, it is possible to sufficiently secure the number of element wires 11 and first twisted wires 121 included in conductor 13 and to sufficiently increase the cross-sectional area of conductor 13 even when element-wire diameter D11 is small. In addition, by setting the number of first twisted wires 121 constituting second twisted wire 122 to 50 or less, productivity in manufacturing second twisted wire 122 can be increased.

FIG. 1 shows an example in which conductor 13 includes first twisted wire 121 and second twisted wire 122, but conductor 13 is not limited to such a form. For example, as thick electric wire 20 shown in FIG. 2, conductor 23 can have first twisted wire 121 in which plurality of element wires 11 are twisted together, second twisted wire 122 in which plurality of first twisted wires 121 are twisted together, and a third twisted wire 123 in which plurality of second twisted wires 122 are twisted together. That is, conductor 23 can also have third twisted wire 123 in which plurality of second twisted wires 122 are twisted together.

Since conductor 23 has third twisted wire 123 in which plurality of second twisted wires 122 are twisted together, appropriate spaces are formed between the element wires and between the twisted wires, and the flexibility of conductor 23 including first twisted wire 121, second twisted wire 122, and third twisted wire 123 and thick electric wire 20 including conductor 23 can be particularly enhanced. In addition, even when the number of element wires 11 is large, it is possible to improve handleability of element wires 11 and improve the productivity of conductor 23 by twisting element wires 11 in multiple stages.

In the case of thick electric wire 20 shown in FIG. 2, 22 element wires 11 are twisted in each first twisted wire 121, 7 first twisted wires 121 are twisted in second twisted wire 122 and 7 second twisted wires 122 are twisted in third twisted wire 123. In the case of thick electric wire 10 shown in FIG. 1, second twisted wire 122 serves as conductor 13. In thick electric wire 20 shown in FIG. 2, third twisted wire 123 is conductor 23.

The number of element wires constituting first twisted wire 121, the number of first twisted wires 121 constituting second twisted wire 122, and the number of second twisted wires 122 constituting third twisted wire 123 are not limited to the above example, and may be any number. For example, the number of second twisted wires 122 constituting third twisted wire 123 may be from 5 to 20.

By setting the number of second twisted wires 122 constituting third twisted wire 123 to 5 or more, it is possible to sufficiently secure the number of element wires 11, first twisted wires 121, and second twisted wire 122 included in conductor 13 and to sufficiently increase the cross-sectional area of conductor 23 even when element-wire diameter D11 is small. In addition, by setting the number of second twisted wires 122 constituting third twisted wire 123 to 20 or less, productivity in manufacturing third twisted wire 123 can be increased.

In FIG. 2, an example in which conductor 23 includes first twisted wire 121, second twisted wire 122, and third twisted wire 123 is shown, but conductor 23 is not limited to this form. The element wires and the twisted wires may be twisted in more stages such as a fourth twisted wire in which plurality of third twisted wires 123 are twisted together.

As shown in FIGS. 1 and 2, when the conductor has a configuration in which a plurality of element wires are twisted in multiple stages, the twisting direction is not limited to a particular direction.

When conductor 13 has a plurality of element wires, the adhesion to electrically insulating layer 14 and the flexibility of thick electric wire 10 may change depending on the element-wire diameters of the plurality of element wires, twisting conditions such as the twisting direction and the twisting pitch.

(1-2) Electrically Insulating Layer (1-2-1) Insulating Resin

Electrically insulating layer 14 can cover the outer surface of conductor 13, specifically the outer surface along the longitudinal direction of thick electric wire 10, as shown in FIG. 1. Electrically insulating layer 14 may contain an insulating resin. The insulating resin is not limited to a particular resin, and as the insulating resin, a material that has sufficient flexibility, suppresses adhesion with conductor 13, and can increase flexibility of thick electric wire 10 can be suitably used.

<Polyolefin-Based Resin>

The insulating resin may contain, for example, a polyolefin-based resin. In particular, in order to impart appropriate flexibility to electrically insulating layer 14, the insulating resin may contain a copolymer of an olefin and a comonomer having polarity.

As the copolymer of an olefin and a comonomer having polarity, for example, one or more types selected from ethylene-ethylacrylate copolymer (EEA), ethylene-methyl-acrylate copolymer (EMA), and ethylene-vinyl acetate copolymer (EVA) may be used. As the copolymer of an olefin and a comonomer having polarity, ethylene-ethylacrylate copolymer (EEA) may be used. That is, the insulating resin may contain ethylene-ethylacrylate copolymer (EEA).

In the case that the insulating resin of electrically insulating layer 14 contains ethylene-ethylacrylate copolymer (EEA), the heat resistance and flame retardancy of electrically insulating layer 14 and the thick electric wire including electrically insulating layer 14 can be particularly enhanced.

In the case that the insulating resin of electrically insulating layer 14 contains ethylene-ethylacrylate copolymer (EEA), the flexibility can be adjusted by selecting the content ratio of ethylacrylate (EA) which is a comonomer.

It has been previously believed that the higher the flexibility of electrically insulating layer 14, the higher the flexibility of thick electric wire 10 including electrically insulating layer 14. However, according to the study by the inventors of the present invention, for example, when the nominal cross-sectional area of conductor 13 is large, the area of the outer surface of conductor 13 is large. Therefore, when the flexibility of electrically insulating layer 14 is excessively increased, the adhesion between conductor 13 and electrically insulating layer 14 is increased. Therefore, the flexibility of thick electric wire 10 may be reduced.

Therefore, when the insulating resin of electrically insulating layer 14 contains ethylene-ethylacrylate copolymer (EEA), ethylene-ethylacrylate copolymer (EEA) may contain more than 10 mass % and less than 35 mass % of ethylacrylate (EA). It may contain from 15 mass % to 30 mass %.

When ethylene-ethylacrylate copolymer (EEA) contains more than 10 mass % of ethylacrylate (EA), the flexibility of electrically insulating layer 14 and thick electric wire 10 including electrically insulating layer 14 can be enhanced. When ethylene-ethylacrylate copolymer (EEA) contains less than 35 mass % of ethylacrylate (EA), electrically insulating layer 14 can be prevented from becoming excessively flexible and increasing the adhesion with conductor 13. Therefore, when ethylene-ethylacrylate copolymer (EEA) contains less than 35 mass % of ethylacrylate (EA), the flexibility of thick electric wire 10 can be enhanced.

<Polyethylene Resin>

The insulating resin of electrically insulating layer 14 may contain a polyethylene resin.

When the insulating resin contains a polyethylene resin, the flexibility of electrically insulating layer 14 or thick electric wire 10 including electrically insulating layer 14 can be particularly enhanced.

As the polyethylene resin, for example, one or more types selected from low density polyethylene (LDPE), linear low density polyethylene (L-LDPE), and very low density polyethylene (VLDPE) may be used. The use of very low density polyethylene (VLDPE) may be particularly preferable.

Low-density polyethylene refers to materials having densities 0.91 g/cm$^3$ or more and less than 0.94 g/cm$^3$, and ultra-low-density polyethylene refers to materials having densities 0.87 g/cm$^3$ or more and less than 0.91 g/cm$^3$. The density of the material can be measured in accordance with JIS K 6922 (2018).

By using low-density polyethylene or ultra-low-density polyethylene as the polyethylene resin, the flexibility of electrically insulating layer 14 or thick electric wire 10 including electrically insulating layer 14 can be particularly enhanced as compared with the case of using the high-density polyethylene.

In a case where electrically insulating layer 14 contains the polyolefin-based resin and the polyethylene resin described above, when the total content of the polyolefin-based resin and the polyethylene resin is 100 mass %, the content of the polyolefin-based resin may be more than 20 mass % and less than 90 mass %. The content may be from 25 mass % to 80 mass %. The content may be from 30 mass % to 70 mass %. The content may be from 30 mass % to 60 mass %.

As the polyolefin-based resin, ethylene-ethylacrylate copolymer can be suitably used as described above. Therefore, for example, when the total content of ethylene-ethylacrylate copolymer and the polyethylene resin is set to 100 mass %, the content of ethylene-ethylacrylate copolymer may be more than 20 mass % and less than 90 mass %. The content may be from 25 mass % to 75 mass %. The content may be from 30 mass % to 70 mass %. The content may be from 30 mass % to 60 mass %.

When the proportion of the polyolefin-based resin such as ethylene-ethylacrylate copolymer is more than 20 mass %, the heat resistance and flame retardancy of electrically insulating layer 14 and thick electric wire 10 including electrically insulating layer 14 can be enhanced. In addition, by setting the proportion of the polyolefin-based resin to less than 90 mass %, the flexibility of electrically insulating layer 14 can be made appropriate, and the flexibility of thick electric wire 10 can be enhanced.

The insulating resin may be cross-linked or non-cross-linked. However, the insulating resin may be crosslinked from the viewpoint of preventing a decrease in electrical insulation due to deformation when an external force is applied in an environment at a relatively high temperature. That is, the insulating resin may be crosslinked from the viewpoint of improving thermal deformation resistance. The crosslinking method is not limited to a particular method, and for example, crosslinking by irradiation with ionizing radiation such as γ-rays or electron beams, or chemical crosslinking such as peroxide crosslinking or silane crosslinking can be used. By performing crosslinking, tensile strength and heat resistance can be improved.

Electrically insulating layer 14 can be formed on the outer surface of conductor 13 by extrusion molding of an electrically insulating layer raw material containing, for example, the insulating resin or an additive. When the insulating resin of electrically insulating layer 14 is cross-linked, the crosslinking can be performed after the electrically insulating layer is extruded.

(1-2-2) Additive

Electrically insulating layer 14 can contain various additives in addition to the above insulating resin. Electrically insulating layer 14 can contain one or more additives selected from, for example, a flame retardant, an antioxidant, a crosslinking agent, a crosslinking aid, and a lubricant.

Known materials can be used as the flame retardant, the antioxidant, and the crosslinking agent, and they are not limited to particular materials.

As the flame retardant, for example, a halogen-based flame retardant or a non-halogen-based flame retardant can be used. As the halogen-based flame retardant, a bromine-based flame retardant or the like can be used. As the non-halogen flame retardant, a metal hydroxide such as magnesium hydroxide can be used. Further, as the non-halogen-based flame retardant, a nitrogen-based flame retardant and antimony trioxide can be used. Further, as the non-halogen-based flame retardant, a phosphorus-based flame retardant such as red phosphorus or phosphoric acid ester can be used.

(1-2-3) Characteristics of Electrically Insulating Layer

Electrically insulating layer 14 may have a secant modulus from 15 MPa to 41 MPa.

The secant modulus in the present specification is obtained as follows. A load at 2% elongation when a test piece having 100 mm in length is pulled in a longitudinal direction at a tensile rate of 50 mm/min using a tensile tester is measured. Next, a value is obtained by dividing the load by a cross-sectional area of the test piece. The secant modulus is obtained by multiplying the value by 50.

By setting the secant modulus of electrically insulating layer 14 to 41 MPa or less, the flexibility of electrically insulating layer 14 and thick electric wire 10 including electrically insulating layer 14 can be enhanced.

In addition, by setting the secant modulus of electrically insulating layer 14 to 15 MPa or more, it is possible to prevent the adhesion of electrically insulating layer 14 to conductor 13 from becoming excessively high, to enhance the flexibility of the thick electric wire, and to enhance the workability when the thick electric wire is attached to the vehicle body of a vehicle or the like.

(1-3) Other Configurations

The thick electric wire of the embodiment of the present disclosure can further comprise a shield layer 35 and an outer periphery covering 36 on the outer surface of a conductor 33 and an electrically insulating layer 34, such as thick electric wire 30 shown in FIG. 3. FIG. 3 is a cross section perpendicular to the longitudinal direction of thick electric wire 30, and shows conductor 33 in a simplified manner.

The configuration of shield layer 35 is not limited to a particular configuration, and can have the same configuration of a shield layer used in a coaxial cable, for example. Shield layer 35 may have, for example, a structure in which a metal wire is laterally wound or braided on the outer periphery of electrically insulating layer 34. As a material of the metal wire included in shield layer 35, copper, aluminum, a copper alloy, or the like can be used. The surface of the metal wire of the shield layer may be plated with silver or tin. Therefore, as the metal wire of the shield layer, for example, a silver-plated copper alloy or a tin-plated copper alloy can be used.

By providing shield layer 35, it is possible to reduce intrusion of noise from the outside and signal leakage to the outside.

The configuration of outer periphery covering 36 is not limited to a particular configuration, and can have any configuration different from the electrically insulating layer described above, but can have the same configuration as the electrically insulating layer, for example. Therefore, a description thereof will be omitted.

(2) Characteristics of Thick Electric Wire

According to the study of the inventors of the present invention, when the nominal cross-sectional area of the conductor of the thick electric wire is large, in order to increase the flexibility of the thick electric wire, the following repulsive force and conductor adhesive force may be within a predetermined range according to the nominal cross-sectional area of the conductor. The flexibility of the thick electric wire means that the thick electric wire can be easily bent, for example, when the thick electric wire is attached to a vehicle.

Therefore, the repulsive force and the conductor adhesive force will be described below.

The repulsive force and the conductor adhesive force vary depending on the configuration of the conductor, the material of the electrically insulating layer, and the like.

(2-1) Repulsive Force

Thick electric wire 10 of the embodiment of the present disclosure may have a repulsive force corresponding to the nominal cross-sectional area of conductor 13.

The repulsive force may be evaluated according to IEC60794-1-2 Method17c, and refers to a repulsive force when a thick electric wire is bent at a bent portion and a radius of curvature of the bent portion is changed from 100 mm to 50 mm. A smaller repulsive force means a higher flexibility.

Figure 4A:
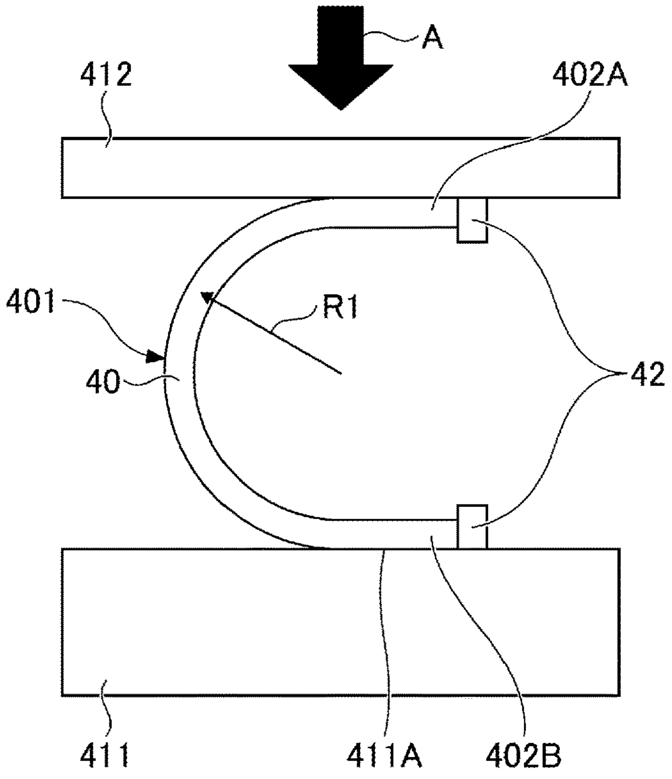
FIG. 4A is an illustration of the radius of curvature of the bent portion at 100 mm when evaluating repulsive force.

Specifically, as shown in FIG. 4A, a second end portion 402B in the longitudinal direction of a thick electric wire 40 is fixed by a fixation member 42 on a fixation surface 411A of a first fixation plate 411. Then, thick electric wire 40 is bent in a U-shape at a bent portion 401 which is one point in the longitudinal direction of thick electric wire 40, and a first end portion 402A in the longitudinal direction of thick electric wire 40 is fixed to fixation member 42 of a second fixation plate 412. Note that fixation surface 411A of first fixation plate 411 and second fixation plate 412 are arranged to be parallel to each other.

Figure 4B:
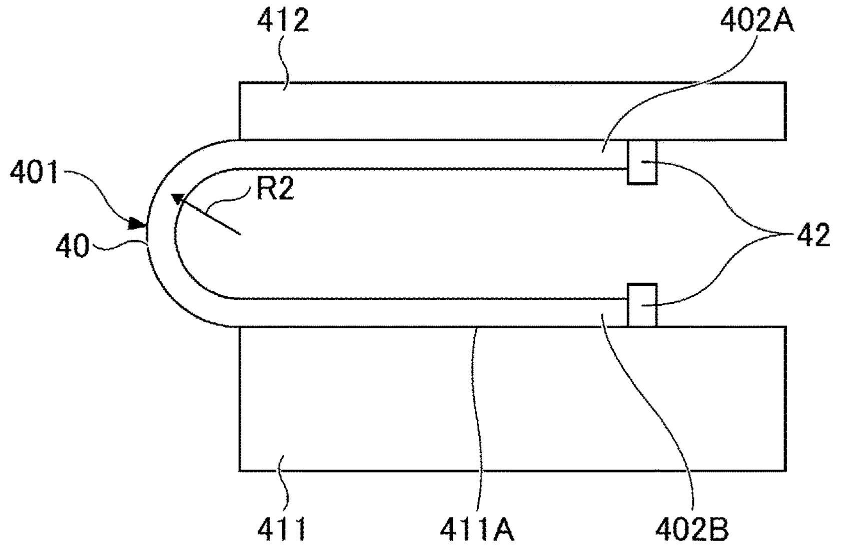
FIG. 4B is an illustration of the radius of curvature of the bent portion at 50 mm when evaluating repulsive force.

A load is applied to thick electric wire 40 along a block arrow A so as to change a state of thick electric wire 40 from a state in which curvature radius R1 at bent portion 401 is 100 mm shown in FIG. 4A to a state in which curvature radius R2 at bent portion 401 is 50 mm shown in FIG. 4B. At this time, the applied load is measured by a load cell (not shown) installed in second fixation plate 412, and the repulsive force can be calculated.

Thick electric wire 10 may have the repulsive force corresponding to the nominal cross-sectional area of conductor 13 as described above. For example, it may have the repulsive force less than or equal to the values shown in Table 1 below.

That is, when the nominal cross-sectional area of conductor 13 is 70 SQ, the repulsive force may be 55N or less. When the nominal cross-sectional area of conductor 13 is 95 SQ, the repulsive force may be 70 N or less. When the nominal cross-sectional area of conductor 13 is 120 SQ, the repulsive force may be 140 N or less.

When the repulsive force is in the above range according to the nominal cross-sectional area of conductor 13, it means that flexibility is excellent when thick electric wire 10 is bent. Therefore, the thick electric wire is particularly excellent in flexibility by being satisfied together with a conductor adhesive force to be described later, and it is possible to enhance workability when being attached to a vehicle body of a vehicle or the like.

The lower limit value of the repulsive force is not limited to a particular value, and may be larger than 0 regardless of the nominal cross-sectional area of conductor 13, and may be, for example, 5 N or more.

(2-2) Conductor Adhesive Force

Thick electric wire 10 of the embodiment of the present disclosure may have a conductor adhesive force corresponding to the nominal cross-sectional area of conductor 13.

The conductor adhesive force means an adhesive force between conductor 13 and electrically insulating layer 14 when conductor 13 is pulled out from thick electric wire 10 along the longitudinal direction of thick electric wire 10. The conductor adhesive force can be measured by using a conductor adhesive-force measuring tool 500 provided with a through-hole through which only a conductor 53 shown in FIG. 5 passes, for example.

Specifically, first, conductor 53 is exposed by removing an electrically insulating layer 54 of a thick electric wire 50 except a part thereof. At this time, as shown in FIG. 5, electrically insulating layer 54 is left so that a length L of electrically insulating layer 54 along the longitudinal direction of thick electric wire 50 becomes 50 mm.

Then, exposed conductor 53 is inserted into the through-hole of conductor adhesive-force measuring tool 500. Thus, as shown in FIG. 5, thick electric wire 10 is set in conductor adhesive-force measuring tool 500.

Figure 5:
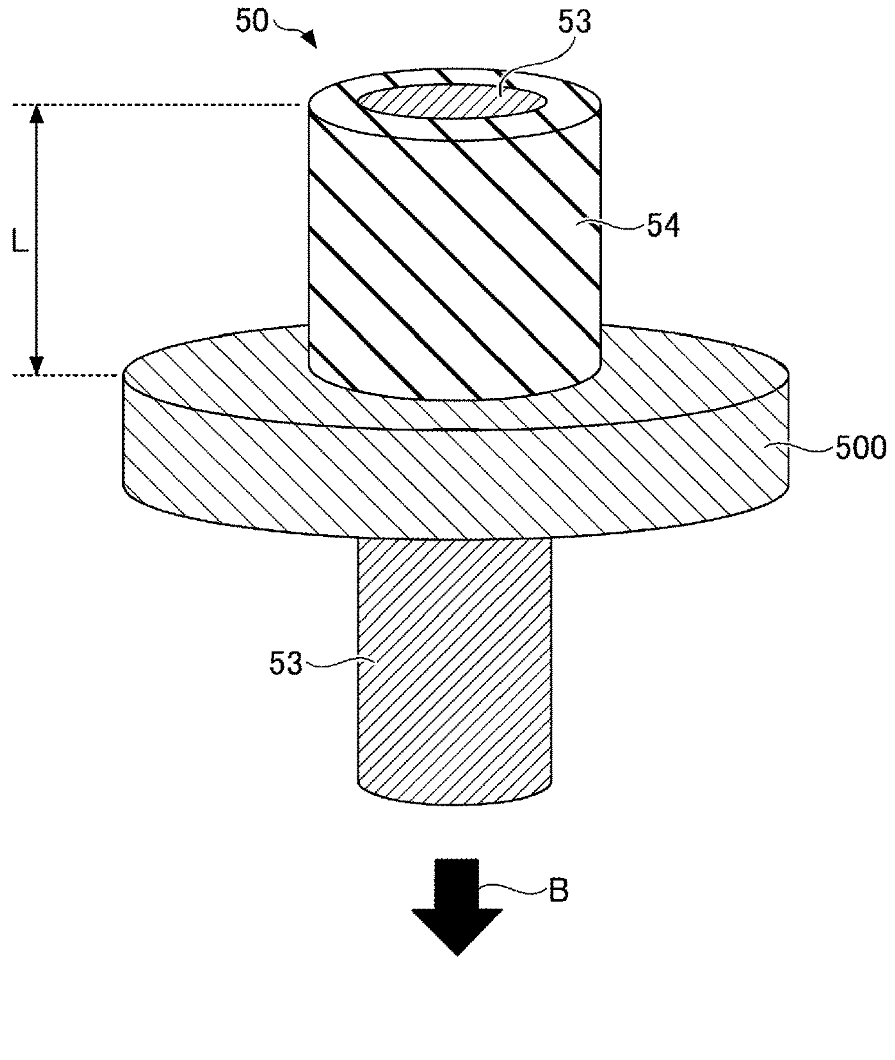
FIG. 5 is an illustration of a method for evaluating conductor adhesive force.

Next, in a state in which conductor adhesive-force measuring tool 500 is fixed, thick electric wire 10 is pulled at a speed of 250 mm/min along the longitudinal direction of thick electric wire 10 indicated by a block arrow B in FIG. 5. Then, the magnitude of the force applied when conductor 53 is peeled from electrically insulating layer 54 and conductor 53 passes through the through-hole of conductor adhesive-force measuring tool 500 and moves to the lower side of conductor adhesive-force measuring tool 500 is measured. The magnitude of the measured force can be taken as the conductor adhesive force of the thick electric wire.

The thick electric wire may have the conductor adhesive force corresponding to the nominal cross-sectional area of the conductor as described above. For example, the conductor adhesive force may be less than or equal to the values shown in Table 1 below.

That is, when the nominal cross-sectional area of conductor 13 is 70 SQ, the conductor adhesive force may be 50 N or less. When the nominal cross-sectional area of conductor 13 is 95 SQ, the conductor adhesive force may be 50 N or less. When the nominal cross-sectional area of conductor 13 is 120 SQ, the conductor adhesive force may be 50 N or less.

When the conductor adhesive force is in the above range in accordance with the nominal cross-sectional area of conductor 13, the adhesion between conductor 13 and electrically insulating layer 14 is appropriate, and by satisfying the above repulsive force together, the thick electric wire is excellent in peeling processability in addition to flexibility, and can enhance workability at the time of attachment to a vehicle body of a vehicle. The peeling processability means the easiness of peeling off the electrically insulating layer when the electrically insulating layer is peeled off from the conductor at the end of the thick electric wire or the like.

The lower limit value of the conductor adhesive force is not limited to a particular value, and may be, for example, 5 N or more regardless of the nominal cross-sectional area of conductor 13. It may be 10 N or more. By setting the conductor adhesive force to 5 N or more, it is possible to prevent conductor 13 and electrically insulating layer 14 from being displaced when handling thick electric wire 10.

TABLE 1

| | 70SQ | 95SQ | 120SQ |
|---|---|---|---|
| REPULSIVE FORCE (N) | 55 | 70 | 140 |
| CONDUCTOR ADHESIVE FORCE (N) | 50 | 50 | 50 |

(2-3) Preferred Uses

The thick electric wire of the embodiment of the present disclosure may be used as various electric wires for electric vehicles, and particularly, may be a thick electric wire used for large current and high voltage.

The large current means that use current is 100 A or more. The high voltage means that the voltage is 30 V or more, and in particular, is from 30 V to 100 V in the case of an alternating current, and is from 60 V to 1500 V in the case of a direct current. In this specification, "large current" and "high voltage" have the similar meaning.

Conventionally, the thick electric wire used for the large current and the high voltage has the large cross-sectional area of the conductor in consideration of an allowable current, a smoking characteristic, and the like. Therefore, it is inferior in flexibility and has a problem in workability when it is attached to a vehicle of an automobile or the like. On the other hand, according to the thick electric wire of the embodiment of the present disclosure, since it has sufficient flexibility, it is possible to enhance workability when it is attached to a vehicle of an automobile or the like.

EXAMPLES

The present invention will be described below with reference to specific examples, but is not limited to these examples.

Evaluation Method

First, an evaluation method of a thick electric wire manufactured in the following experimental examples will be described.

(1) Element-Wire Diameter, Outer Diameter of Conductor, Outer Diameter of Thick Electric Wire, Thickness of Electrically Insulating Layer, and Calculated Cross-Sectional Area Element-wire diameter D11 of element wire 11, a conductor outer diameter D13 which is an outer diameter of conductor 13, an electric-wire outer diameter D10 which is an outer diameter of thick electric wire 10, and an electrically insulating layer thickness T14 were measured and calculated in accordance with JASO D618: 2013.

To be specific, electric-wire outer diameter D10 was measured at three points having substantially equal angles in a same evaluation plane perpendicular to the axial direction of the wire. Electric-wire outer diameter D10 in the evaluation plane was obtained by averaging the measured values. This was performed along the longitudinal direction of the thick electric wire at three cross-sections, i.e., at three evaluation planes with the adjacent evaluation planes 1 m apart, and maximum, average, and minimum values were recorded from the measurement results at the three evaluation planes. Electric-wire outer diameter D10 was taken as the average value above.

Conductor outer diameter D13 was taken as the maximum value of the inner-diameter of the electrically insulating layer measured in the same manner after the thick electric wire was vertically cut at the position where electric-wire outer diameter D10 was measured.

Electrically insulating layer thickness 114 was obtained by calculating ½ of the difference between the obtained minimum wire outer diameter and the conductor outer diameter.

Element-wire diameter D11 of element wire 11 was also measured and calculated in the same manner as in the case of the wire outer diameter.

In Tables 2 to 6, element-wire diameter D11 of element wire 11 is shown in the "element-wire diameter" column. Conductor outer diameter D13 of conductor 13 is shown in the "conductor diameter" column. Electric-wire outer diameter D10 which is the outer diameter of thick electric wire 10 is shown in the "outer diameter" column. Electrically insulating layer thickness 114 is shown in the column of "electrically insulating layer thickness" in Tables 2 to 6.

The cross-sectional area of each element wire 11 (element wire cross-sectional area) was calculated from the diameters of each element wire 11 which is element-wire diameter D11. Then, the cross-sectional area of conductor 13 was calculated by the product of the cross-sectional area of the element wire and the number of element wires contained in conductor 13. The calculated cross-sectional area is shown in the column of "calculated cross-sectional area" in Tables 2 to 6.

(2) Secant Modulus

In order to measure the secant modulus, a test piece in which the electrically insulating layer was made under the same condition as in each experimental example was prepared. A load at 2% elongation when the test piece having 100 mm in length was pulled in a longitudinal direction at a tensile rate of 50 mm/min using a tensile tester was measured. Next, a value was obtained by dividing the load by a cross-sectional area of the test piece. The secant modulus was obtained by multiplying the value by 50.

(3) Repulsive Force

As shown in FIG. 4A, second end portion 402B in the longitudinal direction of thick electric wire 40 to be evaluated was fixed by fixation member 42 on fixation surface 411A of first fixation plate 411. Then, thick electric wire 40 was bent into a U-shape at bent portion 401 which is one point in the longitudinal direction of thick electric wire 40, and first end portion 402A in the longitudinal direction of thick electric wire 40 was fixed to fixation member 42 of second fixation plate 412. Fixation surface 411A of first fixation plate 411 and second fixation plate 412 were arranged to be parallel to each other.

Next, a load was applied to thick electric wire 40 along a block arrow A so as to change a state of thick electric wire 40 from a state in which curvature radius R1 at bent portion 401 was 100 mm shown in FIG. 4A to a state in which curvature radius R2 at bent portion 401 was 50 mm shown in FIG. 4B. At this time, the applied load was measured by a load cell (not shown) installed in second fixation plate 412, and the repulsive force was calculated.

The repulsive force was evaluated as A to C based on the measured values according to the criteria corresponding to the nominal cross-sectional area of the conductor of the thick electric wire. A means that the repulsive force is sufficiently small and the flexibility of the thick electric wire is excellent, and the flexibility is decreased in the order of B and C.

(4) Conductor Adhesive Force

The measurement was performed by using conductor adhesive-force measuring tool 500 provided with a through-hole through which only conductor 53 shown in FIG. 5 passes.

Specifically, conductor 53 was exposed by removing electrically insulating layer 54 of thick electric wire 50 to be evaluated except for a part. At this time, as shown in FIG. 5, electrically insulating layer 54 was left so that length L of electrically insulating layer 54 along the longitudinal direction of thick electric wire 50 was 50 mm.

Then, exposed conductor 53 was inserted into the through-hole of conductor adhesive-force measuring tool 500. Thus, as shown in FIG. 5, thick electric wire 10 was set in conductor adhesive-force measuring tool 500.

Subsequently, in a state in which conductor adhesive-force measuring tool 500 was fixed, thick electric wire 10 was pulled at a speed of 250 mm/min along the longitudinal direction of thick electric wire 10 indicated by block arrow B in FIG. 5. Then, the magnitude of the force applied when conductor 53 was peeled from electrically insulating layer 54 and conductor 53 passed through the through-hole of conductor adhesive-force measuring tool 500 and moved to the lower side of conductor adhesive-force measuring tool 500 was measured. The magnitude of the measured force was taken as the conductor adhesive force which is an adhesive force between the conductor and the electrically insulating layer of the thick electric wire.

The conductor adhesive force was evaluated as A to C based on the measured values according to the criteria corresponding to the nominal cross-sectional area of the conductor of the thick electric wire. A means that the conductor adhesive force is sufficiently small and the adhesive force between the conductor and the electrically insulating layer can be appropriately suppressed, and means that the conductor adhesive force increases in the order of B and C.

The thick electric wire in each experimental example will be described below.

Experimental Example 1

In Experimental Example 1 below, thick electric wires of Experimental Example 1-1 to Experimental Example 1-11 in which the nominal cross-sectional area of a conductor is 70 SQ were produced. Experimental Examples 1-3 to 1-9 are Examples, and Experimental Examples 1-1, 1-2, 1-10, and 1-11 are Comparative Examples.

Experimental Example 1-1

In Experimental Example 1-1, as shown in FIG. 1, the thick electric wire including conductor 13 and electrically insulating layer 14 covering the outer surface of conductor 13 was produced in a cross section perpendicular to the longitudinal direction.

<Conductor>

In conductor 13, as shown in Table 2, 182 element wires 11 each having element-wire diameter D11 of 0.16 mm were twisted together to form first twisted wire 121, and 19 first twisted wires 121 were twisted together to form second twisted wire 122. Second twisted wire 122 serves as conductor 13.

In the notation of "19/182/0.16" in the column of conductor configuration in Table 2, the right end indicates an element-wire diameter, and the second numerical value from the right end means the number of element wires constituting a first twisted wire produced by twisting element wires having the element-wire diameter. The numerical value at the left end means the number of first twisted wires constituting a second twisted wire produced by twisting the first twisted wires.

<Electrically Insulating Layer>

After the material of the electrically insulating layer was extruded on the outer surface of conductor 13, crosslinking treatment was performed by electron beam irradiation to form electrically insulating layer 14 covering the outer surface of conductor 13.

In electrically insulating layer 14, the insulating resin is composed of a mixture of ethylene-ethylacrylate copolymer (EEA) and very low density polyethylene (VLDPE).

A material having ethylacrylate (EA) content of 25 mass % was used for ethylene-ethylacrylate copolymer (EEA).

In addition, the content ratio of ethylene-ethylacrylate copolymer (EEA) in the insulating resin was 50 mass %, and the remainder was very low density polyethylene (VLDPE).

To electrically insulating layer 14, 55 parts by mass of the flame retardant, 25 parts by mass of the antioxidant, 1.5 parts by mass of the lubricant, and 3 parts by mass of the crosslinking aid were added as additives to 100 parts by mass of the insulating resin. The secant modulus of electrically insulating layer 14 was 20 MPa.

In the thick electric wire of the present experimental example, since the number of element wires is very large, that is, 3458 wires, the production cost is very high, and only a limited number of facilities can produce such a wire. Because of this, the repulsive force and the conductor adhesive force were not evaluated.

Experimental Example 1-2

As for conductor 13, as shown in Table 2, 93 element wires 11 each having element-wire diameter D11 of 0.16 mm were twisted together to form first twisted wire 121, and 37 first twisted wires 121 were twisted together to form second twisted wire 122. Second twisted wire 122 serves as conductor 13.

The thick electric wire was produced in the same manner as in Experimental Example 1-1 except for the above points.

In the thick electric wire of the present experimental example, since the number of element wires is very large, that is, 3441 wires, the production cost is very high, and only a limited number of facilities can produce such a wire. Because of this, the repulsive force and the conductor adhesive force were not evaluated.

Experimental Example 1-3 to Experimental Example 1-11

The thick electric wire was produced in the same manner as in Experimental Example 1-1 except that the conductor configuration of conductor 13 was changed as shown in Table 2. That is, the thick electric wire was produced in the same manner as in Experimental Example 1-1 except that the element-wire diameter, the number of element wires constituting the first twisted wire, and the number of first twisted wires constituting the second twisted wire were changed.

The obtained thick electric wire was evaluated as described above. The evaluation results are shown in Table 2.

The repulsive force was evaluated as A in the case of 45 N or less, evaluated as B in the case of more than 45 N and 55N or less, and evaluated as C in the case of more than 55 N.

The conductor adhesive force was evaluated as A in the case of 30 N or less, evaluated as B in the case of more than 30 N and 50 N or less, and evaluated as C in the case of more than 50 N.

The cost was evaluated as A to C according to the manufacturing cost, that is, the total of the material cost and the processing cost. The material cost increases, for example, as the amount of contained copper increases, and the processing cost increases, for example, as the total number of element wires or the number of second twisted wires increases. A means the lowest cost, and B and C mean higher costs in this order. This means that the cost can be sufficiently suppressed in the case of A or B. In the following Experimental Examples 2 and 3, the cost was evaluated in the same manner. When the cost was evaluated as C, the repulsive force and the conductor adhesive force were not evaluated, and the following comprehensive evaluation was made as C.

The comprehensive evaluation was determined as follows. In the evaluations of the repulsive force, the conductor adhesive force, and the cost, A was set to 3 points, B was set to 2 points, and C was set to −1 point. Next, total points of these evaluations were taken as a total score. The comprehensive evaluation was determined to be A when the total score was 9 points, B when the total score was from 6 points to 8 points, and C when the total score was 5 points or less.

When the comprehensive evaluation is A or B, it means that the thick electric wire has the appropriate adhesive force between conductor 13 and electrically insulating layer 14 and is excellent in flexibility and cost.

TABLE 2

| | | | EXPERIMENTAL EXAMPLE 1-1 | EXPERIMENTAL EXAMPLE 1-2 | EXPERIMENTAL EXAMPLE 1-3 | EXPERIMENTAL EXAMPLE 1-4 | EXPERIMENTAL EXAMPLE 1-5 | EXPERIMENTAL EXAMPLE 1-6 |
|---|---|---|---|---|---|---|---|---|
| CONDUCTOR | CONDUCTOR CONFIGURATION | | 19/182/0.16 | 37/93/0.16 | 19/113/0.20 | 19/117/0.20 | 37/60/0.20 | 19/69/0.26 |
| | ELEMENT-WIRE DIAMETER (mm) | | 0.16 | | | 0.20 | | 0.26 |
| | CONDUCTOR DIAMETER (mm) | | 2.5 | 12.5 | 12.5 | 12.5 | 12.5 | 11.5 |
| | CALCULATED CROSS-SECTIONAL AREA ($mm^2$) | | 69.53 | 69.19 | 67.45 | 69.84 | 69.74 | 69.60 |
| ELECTRICALLY INSULATING LAYER | ELECTRICALLY INSULATING LAYER THICKNESS (mm) | | 1.5 | 1.5 | 1.5 | 1.5 | 1.5 | 1.5 |
| | SECANT MODULUS (MPa) | | 20 | 20 | 20 | 20 | 20 | 20 |
| OUTER DIAMETER (mm) | | | 15.5 | 15.5 | 15.5 | 15.5 | 15.5 | 14.5 |
| EVALUATION | REPULSIVE FORCE | MEASURED VALUE (N) | — | — | 29 | 32 | 30 | 36 |
| | | EVALUATION | — | — | A | A | A | A |

TABLE 2-continued

| | | | | | | | | |
|---|---|---|---|---|---|---|---|---|
| | CONDUCTOR ADHESIVE FORCE | MEASURED VALUE (N) | — | — | 30 | 29 | 28 | 19 |
| | | EVALUATION | — | — | A | A | A | A |
| | COST | EVALUATION | C | C | A | B | B | A |
| | COMPREHENSIVE EVALUATION | | C | C | A | B | B | A |

| | | | EXPERIMENTAL EXAMPLE 1-7 | EXPERIMENTAL EXAMPLE 1-8 | EXPERIMENTAL EXAMPLE 1-9 | EXPERIMENTAL EXAMPLE 1-10 | EXPERIMENTAL EXAMPLE 1-11 |
|---|---|---|---|---|---|---|---|
| CONDUCTOR | CONDUCTOR CONFIGURATION | | 37/36/0.26 | 19/45/0.32 | 37/23/0.32 | 19/36/0.36 | 37/18/0.36 |
| | ELEMENT-WIRE DIAMETER (mm) | | 0.26 | 0.32 | | 0.36 | |
| | CONDUCTOR DIAMETER (mm) | | 11.5 | 11.5 | 11.5 | 12.5 | 2.5 |
| | CALCULATED CROSS-SECTIONAL AREA ($mm^2$) | | 70.72 | 68.76 | 68.44 | 69.62 | 67.79 |
| ELECTRICALLY INSULATING LAYER | ELECTRICALLY INSULATING LAYER THICKNESS (mm) | | 1.5 | 1.5 | 1.5 | 1.5 | 1.5 |
| | SECANT MODULUS (MPa) | | 20 | 20 | 20 | 20 | 20 |
| OUTER DIAMETER (mm) | | | 14.5 | 14.5 | 14.5 | 15.5 | 15.5 |
| EVALUATION | REPULSIVE FORCE | MEASURED VALUE (N) | 40 | 46 | 50 | 58 | 56 |
| | | EVALUATION | A | B | B | C | C |
| | CONDUCTOR ADHESIVE FORCE | MEASURED VALUE (N) | 20 | 20 | 20 | 24 | 25 |
| | | EVALUATION | A | A | A | A | A |
| | COST | EVALUATION | B | A | B | A | B |
| | COMPREHENSIVE EVALUATION | | B | B | B | C | C |

In the thick electric wires of Experimental Examples 1-1 and 1-2, since the cost was evaluated as C, the repulsive force and the conductor adhesive force were not evaluated, and the comprehensive evaluation was C.

The thick electric wires of Experimental Examples 1-3 to 1-9 were evaluated as A or B in the comprehensive evaluation, and it was confirmed that these thick electric wires were excellent in flexibility and cost. On the other hand, the thick electric wires of Experimental Examples 1-10 and 1-11 were evaluated as C in the comprehensive evaluation. It was confirmed that Experimental Examples 1-10 and 1-11 were inferior in flexibility.

From the above results, it was confirmed that the flexibility of the thick electric wire is changed by changing the configuration of the conductor, specifically, by changing the element-wire diameter of the element wire, for example.

In addition, with respect to the thick electric wire in which the nominal cross-sectional area of the conductor is 70 SQ, when the repulsive force is 55 N or less and the conductor adhesive force is 50 N or less, it was confirmed that all of the evaluations of the repulsive force, the conductor adhesive force, and the cost, and the comprehensive evaluation become A or B.

Experimental Example 2

In Experimental Example 2 below, thick electric wires of Experimental Example 2-1 to Experimental Example 2-11 in which the nominal cross-sectional area of the conductor is 95 SQ were produced. Experimental Examples 2-3 to 2-9 are Examples, and Experimental Examples 2-1, 2-2, 2-10, and 2-11 are Comparative Examples.

Experimental Example 2-1

In Experimental Example 2-1, as shown in FIG. 1, the insulated wire including conductor 13 and electrically insulating layer 14 covering the outer surface of conductor 13 was produced in a cross section perpendicular to the longitudinal direction.

<Conductor>

In conductor 13, as shown in Table 3, 240 element wires 11 each having element-wire diameter D11 of 0.16 mm were twisted together to form first twisted wire 121, and 19 first twisted wires 121 were twisted together to form second twisted wire 122. Second twisted wire 122 serves as conductor 13.

The thick electric wire was produced in the same manner as in Experimental Example 1-1 except for the above points.

However, in the thick electric wire of the present experimental example, since the number of element wires is very large, that is, 4560 wires, the production cost is very high, and only a limited number of facilities can produce such a wire. Because of this, the repulsive force and the conductor adhesive force were not evaluated.

Experimental Example 2-2

As for conductor 13, as shown in Table 3, 126 element wires 11 each having element-wire diameter D11 of 0.16 mm were twisted together to form first twisted wire 121, and 37 first twisted wires 121 were twisted together to form second twisted wire 122. Second twisted wire 122 serves as conductor 13.

The thick electric wire was produced in the same manner as in Experimental Example 2-1 except for the above points.

However, in the thick electric wire of the present experimental example, since the number of element wires is very large, that is, 4662, the production cost is very high, and only a limited number of facilities can produce such a wire. Because of this, the repulsive force and the conductor adhesive force were not evaluated.

Experimental Example 2-3 to Experimental Example 2-11

A thick electric wire was produced in the same manner as in Experimental Example 2-1 except that the configuration of conductor 13 was changed as shown in Table 3. That is, the thick electric wire was produced in the same manner as in Experimental Example 2-1 except that the element-wire diameter, the number of element wires constituting the first twisted wire, and the number of first twisted wires constituting the second twisted wire were changed.

In Experimental Example 2-3, 22 element wires 11 each having element-wire diameter D11 of 0.20 mm were twisted together to form first twisted wire 121, 7 first twisted wires 121 were twisted together to form second twisted wire 122, and 19 second twisted wires 122 were twisted together to form third twisted wire 123. As with thick electric wire 20 shown in FIG. 2, third twisted wire 123 serves as conductor 23.

The obtained thick electric wire was evaluated as described above. The evaluation results are shown in Table 3.

The repulsive force was evaluated as A in the case of 60 N or less, evaluated as B in the case of more than 60 N and 70 N or less, and evaluated as C in the case of more than 70 N.

The conductor adhesive force was evaluated as A in the case of 30 N or less, evaluated as B in the case of more than 30 N and 50 N or less, and evaluated as C in the case of more than 50 N.

The cost was evaluated as A to C according to the manufacturing cost. A has the lowest cost, and B and C have higher costs in this order. This means that the cost can be sufficiently suppressed in the case of A or B. When the cost was evaluated as C, the repulsive force and the conductor adhesive force were not evaluated, and the following comprehensive evaluation was made as C.

The comprehensive evaluation was determined as follows. In the evaluations of the repulsive force, the conductor adhesive force, and the cost, A was set to 3 points, B was set to 2 points, and C was set to −1 point. Next, total points of these evaluations were taken as a total score. The comprehensive evaluation was determined to be A when the total score was 9 points, B when the total score was from 6 points to 8 points, and C when the total score was 5 points or less.

When the comprehensive evaluation is A or B, it means that the thick electric wire has an appropriate adhesive force between conductor 13 and electrically insulating layer 14 and is excellent in flexibility and cost.

TABLE 3

| | | | EXPERIMENTAL EXAMPLE 2-1 | EXPERIMENTAL EXAMPLE 2-2 | EXPERIMENTAL EXAMPLE 2-3 | EXPERIMENTAL EXAMPLE 2-4 | EXPERIMENTAL EXAMPLE 2-5 | EXPERIMENTAL EXAMPLE 2-6 |
|---|---|---|---|---|---|---|---|---|
| CONDUCTOR | CONDUCTOR CONFIGURATION | | 19/240/0.16 | 37/126/0.16 | 19/7/22/0.20 | 37/80/0.20 | 37/48/0.26 | 19/91/0.26 |
| | ELEMENT-WIRE DIAMETER (mm) | | 0.16 | | 0.20 | | 0.26 | |
| | CONDUCTOR DIAMETER (mm) | | 13.6 | 13.6 | 13.6 | 13.6 | 14.3 | 13.7 |
| | CALCULATED CROSS-SECTIONAL AREA ($mm^2$) | | 91.68 | 93.74 | 91.92 | 92.99 | 94.29 | 91.80 |
| ELECTRICALLY INSULATING LAYER | ELECTRICALLY INSULATING LAYER THICKNESS (mm) | | 1.1 | 1.1 | 1.1 | 1.1 | 1.6 | 1.1 |
| | SECANT MODULUS (MPa) | | 20 | 20 | 20 | 20 | 20 | 20 |
| OUTER DIAMETER (mm) | | | 15.8 | 15.8 | 15.8 | 15.8 | 17.5 | 15.9 |
| EVALUATION | REPULSIVE FORCE | MEASURED VALUE (N) | — | — | 45 | 48 | 55 | 45 |
| | | EVALUATION | — | — | A | A | A | A |
| | CONDUCTOR ADHESIVE FORCE | MEASURED VALUE (N) | — | — | 45 | 43 | 30 | 26 |
| | | EVALUATION | — | — | B | B | A | A |
| | COST | EVALUATION | C | C | A | B | B | A |

TABLE 3-continued

| | | | | | | |
|---|---|---|---|---|---|---|
| COMPREHENSIVE EVALUATION | C | C | B | B | B | A |

| | | | EXPERIMENTAL EXAMPLE 2-7 | EXPERIMENTAL EXAMPLE 2-8 | EXPERIMENTAL EXAMPLE 2-9 | EXPERIMENTAL EXAMPLE 2-10 | EXPERIMENTAL EXAMPLE 2-11 |
|---|---|---|---|---|---|---|---|
| CONDUCTOR | CONDUCTOR CONFIGURATION | | 19/91/0.26 | 19/61/0.32 | 37/32/0.32 | 19/48/0.36 | 37/25/0.36 |
| | ELEMENT-WIRE DIAMETER (mm) | | 0.26 | 0.32 | | 0.36 | |
| | CONDUCTOR DIAMETER (mm) | | 13.7 | 14.5 | 14.5 | 14.5 | 14.9 |
| | CALCULATED CROSS-SECTIONAL AREA ($mm^2$) | | 91.80 | 93.21 | 95.22 | 92.83 | 94.15 |
| ELECTRICALLY INSULATING LAYER | ELECTRICALLY INSULATING LAYER THICKNESS (mm) | | 1.6 | 1.6 | 1.6 | 1.6 | 1.6 |
| | SECANT MODULUS (MPa) | | 20 | 20 | 20 | 20 | 20 |
| OUTER DIAMETER (mm) | | | 16.9 | 17.7 | 17.7 | 17.7 | 18.1 |
| EVALUATION | REPULSIVE FORCE | MEASURED VALUE (N) | 50 | 63 | 68 | 73 | 80 |
| | | EVALUATION | A | B | B | C | C |
| | CONDUCTOR ADHESIVE FORCE | MEASURED VALUE (N) | 27 | 30 | 28 | 26 | 29 |
| | | EVALUATION | A | A | A | A | A |
| | COST | EVALUATION | A | A | B | A | B |
| | COMPREHENSIVE EVALUATION | | A | B | B | C | C |

In the thick electric wires of Experimental Examples 2-1 and 2-2, since the cost was evaluated as C, the repulsive force and the conductor adhesive force were not evaluated, and the comprehensive evaluation was C.

The thick electric wires of Experimental Examples 2-3 to 2-9 were evaluated as A or B in the comprehensive evaluation, and it was confirmed that these thick electric wires were excellent in flexibility and cost. On the other hand, the thick electric wires of Experimental Examples 2-10 and 2-11 were evaluated as C in the comprehensive evaluation. It was confirmed that Experimental Examples 2-10 and 2-11 were inferior in flexibility.

That is, it was confirmed that the flexibility of the thick electric wire is changed by changing the configuration of the conductor, specifically, by changing the element-wire diameter of the element wire, for example.

In addition, with respect to the thick electric wire in which the nominal cross-sectional area of the conductor is 95 SQ, when the repulsive force is 70 N or less and the conductor adhesive force is 50 N or less, it was confirmed that all of the evaluations of the repulsive force, the conductor adhesive force, and the cost, and the comprehensive evaluation become A or B.

Experimental Example 3

In Experimental Example 3 below, thick electric wires of Experimental Example 3-1 to Experimental Example 3-9 in which the nominal cross-sectional area of the conductor is a 120 SQ were produced. Experimental Example 3-3 to Experimental Example 3-7 are Examples, and Experimental Examples 3-1, 3-2, 3-8, and 3-9 are Comparative Examples.

Experimental Example 3-1

In Experimental Example 3-1, as shown in FIG. 1, the insulated wire including conductor 13 and electrically insulating layer 14 covering the outer surface of conductor 13 was produced in a cross section perpendicular to the longitudinal direction.

<Conductor>

In conductor 13, as shown in Table 4, 310 element wires 11 each having element-wire diameter D11 of 0.16 mm were twisted together to form first twisted wire 121, and 19 first twisted wires 121 were twisted together to form second twisted wire 122. Second twisted wire 122 serves as conductor 13.

The thick electric wire was produced in the same manner as in Experimental Example 1-1 except for the above points.

However, in the thick electric wire of the present experimental example, since the number of element wires is very large, that is, 5890, the production cost is very high, and only a limited number of facilities can produce such a wire. Because of this, the repulsive force and the conductor adhesive force were not evaluated.

Experimental Example 3-2

As for conductor 13, as shown in Table 4, 160 element wires 11 each having element-wire diameter D11 of 0.16 mm were twisted together to form first twisted wire 121, and 37 first twisted wires 121 were twisted together to form second twisted wire 122. Second twisted wire 122 serves as conductor 13.

The thick electric wire was produced in the same manner as in Experimental Example 3-1 except for the above points. However, in the thick electric wire of the present experimental example, since the number of element wires is very large, that is, 5920, the production cost is very high, and only a limited number of facilities can produce such a wire. Because of this, the repulsive force and the conductor adhesive force were not evaluated.

Experimental Example 3-3 to Experimental Example 3-9

The thick electric wire was produced in the same manner as in Experimental Example 3-1 except that the configuration of conductor 13 was changed as shown in Table 4.

The obtained thick electric wire was evaluated as described above. The evaluation results are shown in Table 4.

The repulsive force was evaluated as A in the case of 130 N or less, evaluated as B in the case of more than 130 N and 140 N or less, and evaluated as C in the case of more than 140 N.

The conductor adhesive force was evaluated as A in the case of 3 0N or less, evaluated as B in the case of more than 30 N and 50 N or less, and evaluated as C in the case of more than 50 N.

The cost was evaluated as A to C according to the manufacturing cost. A has the lowest cost, and B and C have higher costs in this order. This means that the cost can be sufficiently suppressed in the case of A or B. When the cost was evaluated as C, the repulsive force and the conductor adhesive force were not evaluated, and the following comprehensive evaluation was made as C.

The comprehensive evaluation was determined as follows. In the evaluations of the repulsive force, the conductor adhesive force, and the cost, A was set to 3 points, B was set to 2 points, and C was set to −1 point. Next, total points of these evaluations were taken as a total score. The comprehensive evaluation was determined to be A when the total score was 9 points, B when the total score was from 6 points to 8 points, and C when the total score was 5 points or less.

When the comprehensive evaluation is A or B, it means that the thick electric wire has an appropriate adhesive force between conductor 13 and electrically insulating layer 14 and is excellent in flexibility and cost.

TABLE 4

| | | | EXPERIMENTAL EXAMPLE 3-1 | EXPERIMENTAL EXAMPLE 3-2 | EXPERIMENTAL EXAMPLE 3-3 | EXPERIMENTAL EXAMPLE 3-4 | EXPERIMENTAL EXAMPLE 3-5 |
|---|---|---|---|---|---|---|---|
| CONDUCTOR | CONDUCTOR CONFIGURATION | | 19/310/0.16 | 37/160/0.16 | 37/103/0.20 | 19/117/0.26 | 37/60/0.26 |
| | ELEMENT-WIRE DIAMETER (mm) | | 0.16 | | 0.20 | 0.26 | |
| | CONDUCTOR DIAMETER (mm) | | 16.3 | 16.3 | 16.3 | 16.3 | 16.3 |
| | CALCULATED CROSS-SECTIONAL AREA ($mm^2$) | | 118.43 | 119.03 | 119.73 | 118.03 | 117.87 |
| ELECTRICALLY INSULATING LAYER | ELECTRICALLY INSULATING LAYER THICKNESS (mm) | | 1.6 | 1.6 | 1.6 | 1.6 | 1.6 |
| | SECANT MODULUS (MPa) | | 20 | 20 | 20 | 20 | 20 |
| OUTER DIAMETER (mm) | | | 19.5 | 19.5 | 19.5 | 19.5 | 19.5 |
| EVALUATION | REPULSIVE FORCE | MEASURED VALUE (N) | — | — | 132 | 125 | 119 |
| | | EVALUATION | — | — | B | A | A |
| | CONDUCTOR ADHESIVE FORCE | MEASURED VALUE (N) | — | — | 23 | 20 | 22 |
| | | EVALUATION | — | — | A | A | A |
| | COST | EVALUATION | C | C | B | A | A |
| | COMPREHENSIVE EVALUATION | | C | C | B | A | A |

| | | | EXPERIMENTAL EXAMPLE 3-6 | EXPERIMENTAL EXAMPLE 3-7 | EXPERIMENTAL EXAMPLE 3-8 | EXPERIMENTAL EXAMPLE 3-9 |
|---|---|---|---|---|---|---|
| CONDUCTOR | CONDUCTOR CONFIGURATION | | 19/78/0.32 | 37/40/0.32 | 19/62/0.36 | 37/32/0.36 |
| | ELEMENT-WIRE DIAMETER (mm) | | 0.32 | | 0.36 | |
| | CONDUCTOR DIAMETER (mm) | | 16.3 | 16.3 | 16.3 | 16.3 |
| | CALCULATED CROSS-SECTIONAL AREA ($mm^2$) | | 119.19 | 119.03 | 119.91 | 120.52 |

TABLE 4-continued

| | | | | | | |
|---|---|---|---|---|---|---|
| ELECTRICALLY INSULATING LAYER | ELECTRICALLY INSULATING LAYER THICKNESS (mm) | | 1.6 | 1.6 | 1.6 | 1.6 |
| | SECANT MODULUS (MPa) | | 20 | 20 | 20 | 20 |
| OUTER DIAMETER (mm) | | | 19.5 | 19.5 | 19.5 | 19.5 |
| EVALUATION | REPULSIVE FORCE | MEASURED VALUE (N) | 132 | 132 | 143 | 148 |
| | | EVALUATION | B | B | C | C |
| | CONDUCTOR ADHESIVE FORCE | MEASURED VALUE (N) | 23 | 25 | 24 | 25 |
| | | EVALUATION | A | A | A | A |
| | COST | EVALUATION | A | A | A | A |
| | COMPREHENSIVE EVALUATION | | B | B | C | C |

In the thick electric wires of Experimental Examples 3-1 and 3-2, since the cost was evaluated as C, the repulsive force and the conductor adhesive force were not evaluated, and the comprehensive evaluation was C.

The thick electric wires of Experimental Examples 3-3 to 3-7 were evaluated as A or B in the comprehensive evaluation, and it was confirmed that these thick electric wires were excellent in flexibility and cost. On the other hand, the thick electric wires of Experimental Examples 3-8 and 3-9 were evaluated as C in the comprehensive evaluation. It was confirmed that Experimental Examples 3-8 and 3-9 were inferior in flexibility.

That is, it was confirmed that the flexibility of the thick electric wire is changed by changing the configuration of the conductor, specifically, by changing the element-wire diameter of the element wire, for example.

In addition, with respect to the thick electric wire in which the nominal cross-sectional area of the conductor is 120 SQ, when the repulsive force is 140 N or less and the conductor adhesive force is 50 N or less, it was confirmed that all of the evaluations of the repulsive force, the conductor adhesive force, and the cost, and the comprehensive evaluation become A or B.

Experimental Example 4

In Experimental Example 4 below, thick electric wires of Experimental Example 4-1 to Experimental Example 4-5 in which the nominal cross-sectional area of the conductor is 95 SQ were produced. Experimental Examples 4-2 to 4-4 are Examples, and Experimental Examples 4-1 and 4-5 are Comparative Examples.

Experimental Example 4-1

In Experimental Example 4-1, as shown in FIG. 1, the insulated wire including conductor 13 and electrically insulating layer 14 covering the outer surface of conductor 13 was produced in a cross section perpendicular to the longitudinal direction.

<Conductor>

In conductor 13, as shown in Table 5, 91 element wires 11 each having element-wire diameter D11 of 0.26 mm were twisted together to form first twisted wire 121, and 19 first twisted wires 121 were twisted together to form second twisted wire 122. Second twisted wire 122 serves as conductor 13.

<Electrically Insulating Layer>

After the material of the electrically insulating layer was extruded on the outer surface of conductor 13, crosslinking treatment was performed by electron beam irradiation to form electrically insulating layer 14 covering the outer surface of conductor 13.

In electrically insulating layer 14, the insulating resin is composed of a mixture of ethylene-ethylacrylate copolymer (EEA) and very low density polyethylene (VLDPE).

A material having ethylacrylate (EA) content of 10 mass % was used for the ethylene-ethylacrylate copolymer (EEA).

In addition, the content ratio of ethylene-ethylacrylate copolymer (EEA) in the insulating resin was 50 mass %, and the remainder was very low density polyethylene (VLDPE).

To electrically insulating layer 14, 55 parts by mass of the flame retardant, 25 parts by mass of the antioxidant, 1.5 parts by mass of the lubricant, and 3 parts by mass of the crosslinking aid were added as additives to 100 parts by mass of the insulating resin.

Electric-wire outer diameter D10 of thick electric wire 10 was 16.9 mm as shown in Table 5.

The obtained thick electric wire was evaluated as described above. The evaluation results are shown in Table 5.

The repulsive force was evaluated as A in the case of 60 N or less, evaluated as B in the case of more than 60 N and 70 N or less, and evaluated as C in the case of more than 70 N.

The conductor adhesive force was evaluated as A in the case of 30 N or less, evaluated as B in the case of more than 30 N and 50 N or less, and evaluated as C in the case of more than 50 N.

The comprehensive evaluation was determined as follows. In the evaluations of the repulsive force, the conductor adhesive force, and the cost, A was set to 3 points, B was set to 2 points, and C was set to −1 point. Next, total points of these evaluations were taken as a total score. The comprehensive evaluation was determined to be A when the total score was 6 points, B when the total score was from 3 points to 5 points, and C when the total score was 2 points or less.

When the comprehensive evaluation is A or B, it means that the adhesive force between conductor 13 and electrically insulating layer 14 is appropriate and the thick electric wire is excellent in flexibility.

Experimental Example 4-2 to Experimental Example 4-5

As the ethylene-ethylacrylate copolymer (EEA), a material having a content ratio of ethylacrylate (EA) of a value shown in the column of "content ratio of EA in EEA" in Table 5 was used.

The thick electric wire was produced in the same manner as in Experimental Example 4-1 except for the above points, and the obtained thick electric wire was evaluated as described above. The evaluation results are shown in Table 5.

TABLE 5

| | | | EXPERIMENTAL EXAMPLE 4-1 | EXPERIMENTAL EXAMPLE 4-2 | EXPERIMENTAL EXAMPLE 4-3 | EXPERIMENTAL EXAMPLE 4-4 | EXPERIMENTAL EXAMPLE 4-5 |
|---|---|---|---|---|---|---|---|
| CONDUCTOR | CONDUCTOR CONFIGURATION | | | | 19/91/0.26 | | |
| | ELEMENT-WIRE DIAMETER (mm) | | | | 0.26 | | |
| | CONDUCTOR DIAMETER (mm) | | | | 13.7 | | |
| | CALCULATED CROSS-SECTIONAL AREA ($mm^2$) | | | | 91.80 | | |
| ELECTRICALLY INSULATING LAYER | COVERING THICKNESS (mm) | | | | 1.6 | | |
| | INSULATING RESIN | EEA CONTENT (MASS %) | 50 | 50 | 50 | 50 | 50 |
| | | EA CONTENT IN EEA (MASS %) | 10 | 15 | 25 | 30 | 35 |
| | | VLDPE CONTENT (MASS %) | 50 | 50 | 50 | 50 | 50 |
| | SECANT MODULUS (MPa) | | 45 | 35 | 23 | 18 | 14 |
| | OUTER DIAMETER (mm) | | | | 16.9 | | |
| EVALUATION | REPULSIVE FORCE | MEASURED VALUE (N) | 75 | 65 | 50 | 52 | 110 |
| | | EVALUATION | C | B | A | A | C |
| | CONDUCTOR ADHESIVE FORCE | MEASURED VALUE (N) | 19 | 22 | 27 | 35 | 70 |
| | | EVALUATION | A | A | A | B | C |
| | COMPREHENSIVE EVALUATION | | C | B | A | B | C |

The thick electric wires of Experimental Examples 4-2 to 4-4 were evaluated as A or B in the comprehensive evaluation, and it was confirmed that thick electric wires were excellent in flexibility. On the other hand, the thick electric wires of Experimental Examples 4-1 and 4-5 were evaluated as C in the comprehensive evaluation, and it was confirmed that they were inferior in flexibility.

That is, it was confirmed that the flexibility of the thick electric wire was changed by changing the configuration of the electrically insulating layer, specifically, for example, by changing the secant modulus of the electrically insulating layer.

In addition, it was confirmed that when ethylene-ethylacrylate copolymer contained more than 10 mass % and less than 35 mass % of ethylacrylate, the secant modulus of the electrically insulating layer was from 15 MPa to 41 MPa. In this case, it was confirmed that all of the evaluations of the repulsive force and the conductor adhesive force and the comprehensive evaluation become A or B.

Experimental Example 5

In Experimental Example 5 below, thick electric wires of Experimental Example 5-1 to Experimental Example 5-7 in which the nominal cross-sectional area of the conductor is a 95 SQ were produced. Experimental Examples 5-2 to 5-6 are Examples, and Experimental Examples 5-1 and 5-7 are Comparative Examples.

Experimental Example 5-1

In Experimental Example 5-1, as shown in FIG. 1, an insulated wire including conductor 13 and electrically insulating layer 14 covering an outer surface of conductor 13 was produced in a cross section perpendicular to the longitudinal direction.

<Conductor>

In conductor 13, as shown in Table 6, 91 element wires 11 each having element-wire diameter D11 of 0.26 mm were twisted together to form first twisted wire 121, and 19 first twisted wires 121 were twisted together to form second twisted wire 122. Second twisted wire 122 serves as conductor 13.

<Electrically Insulating Layer>

After the material of the electrically insulating layer was extruded on the outer surface of conductor 13, crosslinking treatment was performed by electron beam irradiation to form electrically insulating layer 14 covering the outer surface of conductor 13.

In electrically insulating layer 14, the insulating resin is composed of a mixture of ethylene-ethylacrylate copolymer (EEA) and very low density polyethylene (VLDPE).

A material having ethylacrylate (EA) content of 25 mass % was used for ethylene-ethylacrylate copolymer (EEA).

In addition, the content ratio of ethylene-ethylacrylate copolymer (EEA) in the insulating resin was 20 mass %, and the remainder was very low density polyethylene (VLDPE).

To electrically insulating layer 14, 55 parts by mass of the flame retardant, 25 parts by mass of the antioxidant, 1.5 parts by mass of the lubricant, and 3 parts by mass of the crosslinking aid were added as additives to 100 parts by mass of the insulating resin.

Electric-wire outer diameter D10 of thick electric wire 10 was 16.9 mm as shown in Table 6.

The obtained thick electric wire was evaluated as described above. The evaluation results are shown in Table 6.

The repulsive force was evaluated as A in the case of 60 N or less, evaluated as B in the case of more than 60 N and 70 N or less, and evaluated as C in the case of more than 70 N.

The conductor adhesive force was evaluated as A in the case of 30 N or less, evaluated as B in the case of more than 30 N and 50 N or less, and evaluated as C in the case of more than 50 N.

The comprehensive evaluation was determined as follows. In the evaluations of the repulsive force, the conductor adhesive force, and the cost, A was set to 3 points, B was set to 2 points, and C was set to −1 point. Next, total points of these evaluations were taken as a total score. The comprehensive evaluation was determined to be A when the total score was 6 points, B when the total score was from 3 points to 5 points, and C when the total score was 2 points or less.

When the comprehensive evaluation is A or B, it means that the adhesive force between conductor 13 and electrically insulating layer 14 is appropriate and the thick electric wire is excellent in flexibility.

Experimental Example 5-2 to Experimental Example 5-6

The content ratio of ethylene-ethylacrylate copolymer (EEA) in the insulating resin was set to the value shown in the column of "content ratio of EEA" in Table 6. The content of ultra-low density polyethylene was the remainder of the insulating resin excluding ethylene-ethylacrylate copolymer (EEA), and was the value shown in the column "VLDPE content".

A thick electric wire was produced in the same manner as in Experimental Example 5-1 except for the above points, and the obtained thick electric wire was determined as described above. The evaluation results are shown in Table 6.

TABLE 6

| | | | EXPERIMENTAL EXAMPLE 5-1 | EXPERIMENTAL EXAMPLE 5-2 | EXPERIMENTAL EXAMPLE 5-3 | EXPERIMENTAL EXAMPLE 5-4 | EXPERIMENTAL EXAMPLE 5-5 | EXPERIMENTAL EXAMPLE 5-6 | EXPERIMENTAL EXAMPLE 5-7 |
|---|---|---|---|---|---|---|---|---|---|
| CONDUCTOR | CONDUCTOR CONFIGURATION | | 19/91/0.26 | | | | | | |
| | ELEMENT-WIRE DIAMETER (mm) | | 0.26 | | | | | | |
| | CONDUCTOR DIAMETER (mm) | | 13.7 | | | | | | |
| | CALCULATED CROSS-SECTIONAL AREA ($mm^2$) | | 91.80 | | | | | | |
| ELECTRICALLY INSULATING LAYER | COVERING THICKNESS (mm) | | 1.6 | | | | | | |
| | INSULATING RESIN | EEA CONTENT (MASS %) | 20 | 25 | 35 | 50 | 70 | 80 | 90 |
| | | EA CONTENT IN EEA (MASS %) | 25 | 25 | 25 | 25 | 25 | 25 | 25 |
| | | VLDPE CONTENT (MASS %) | 80 | 75 | 65 | 50 | 30 | 20 | 10 |
| | SECANT MODULUS (MPa) | | 13 | 15 | 17 | 20 | 25 | 31 | 42 |
| OUTER DIAMETER (mm) | | | 16.9 | | | | | | |
| EVALUATION | REPULSIVE FORCE | MEASURED VALUE (N) | 42 | 43 | 46 | 50 | 65 | 70 | 82 |
| | | EVALUATION | A | A | A | A | B | B | C |
| | CONDUCTOR ADHESIVE FORCE | MEASURED VALUE (N) | 55 | 45 | 30 | 27 | 25 | 23 | 20 |
| | | EVALUATION | C | B | A | A | A | A | A |
| | COMPREHENSIVE EVALUATION | | C | B | A | A | B | B | C |

The thick electric wires of Experimental Examples 5-2 to 5-6 were evaluated as A or B in the comprehensive evaluation, and it was confirmed that these thick electric wires were excellent in flexibility. On the other hand, the thick electric wires of Experimental Examples 5-1 and 5-7 were evaluated as "C" in the comprehensive evaluation, and it was confirmed that they were inferior in flexibility.

That is, it was confirmed that the flexibility of the thick electric wire was changed by changing the configuration of the electrically insulating layer, specifically, for example, by changing the secant modulus of the electrically insulating layer.

It was confirmed that the secant modulus of the electrically insulating layer becomes from 15 MPa to 41 MPa when the insulating resin contains the polyethylene resin and the total content of ethylene-ethylacrylate copolymer and the polyethylene resin is 100 mass % and then the content of ethylene-ethylacrylate copolymer is more than 20 mass % and less than 90 mass %. In this case, it was confirmed that all of the evaluations of the repulsive force and the conductor adhesive force and the comprehensive evaluation were A or B.

Experimental Example 6

In Experimental Example 6 below, the nominal cross-sectional area of the conductor was 160 SQ.

In Experimental Example 6, as shown in FIG. 1, the insulated wire including conductor 13 and electrically insulating layer 14 covering the outer surface of conductor 13 was produced.

<Conductor>

In Experimental Example 6-1, conductor 13 was configured such that, as shown in Table 7, 54 element wires 11 each having element-wire diameter D11 of 0.32 mm were twisted together to form first twisted wire 121, and 37 first twisted wires 121 were twisted together to form second twisted wire 122.

In Experimental Example 6-2, conductor 13 was configured such that, as shown in Table 7, 80 element wires 11 each having element-wire diameter D11 of 0.26 mm were twisted together to form first twisted wire 121, and 37 first twisted wires 121 were twisted together to form second twisted wire 122.

In Experimental Example 6-3, conductor 13 was configured such that, as shown in Table 7, 168 element wires 11 each having element-wire diameter D11 of 0.18 mm were twisted together to form first twisted wire 121, and 37 first twisted wires 121 were twisted together to form second twisted wire 122.

<Electrically Insulating Layer>

The electrically insulating layer was made in the same manner as in Experimental Example 1. The thickness of the electrically insulating layer was 1.6 mm.

The obtained thick electric wire was evaluated as previously described. The evaluation results are shown in Table 7.

TABLE 7

| | | | EXPERIMENTAL EXAMPLE 6-1 | EXPERIMENTAL EXAMPLE 6-2 | EXPERIMENTAL EXAMPLE 6-3 |
|---|---|---|---|---|---|
| CONDUCTOR | CONDUCTOR CONFIGURATION | | 37/54/0.32 | 37/80/0.26 | 37/168/0.18 |
| | ELEMENT-WIRE DIAMETER (mm) | | 0.32 | 0.26 | 0.18 |
| | CONDUCTOR DIAMETER (mm) | | 18.9 | 19.0 | 19.2 |
| | CALCULATED CROSS-SECTIONAL AREA ($mm^2$) | | 160.69 | 157.16 | 158.18 |
| ELECTRICALLY INSULATING LAYER | ELECTRICALLY INSULATING LAYER THICKNESS (mm) | | 1.6 | 1.6 | 1.6 |
| | SECANT MODULUS (MPa) | | 20 | 20 | 20 |
| OUTER DIAMETER (mm) | | | 22.1 | 22.2 | 22.4 |
| EVALUATION | REPULSIVE FORCE | MEASURED VALUE (N) | 167 | 160 | — |
| | | EVALUATION | A | A | — |
| | CONDUCTOR ADHESIVE FORCE | MEASURED VALUE (N) | 20 | 22 | — |
| | | EVALUATION | A | A | — |
| | COST | EVALUATION | A | B | C |
| | COMPREHENSIVE EVALUATION | | A | B | C |

The repulsive force was evaluated as A in the case of 200 N or less.

The conductor adhesive force was evaluated as A in the case of 30 N or less.

The cost was evaluated as A to C according to the manufacturing cost. A indicates the lowest cost, and B and C indicate higher costs that increase in this order. The fact that the evaluated cost was A or B indicates that the cost was sufficiently suppressed. When the cost was evaluated as C, the repulsive force and the conductor adhesive force were not evaluated, and the comprehensive evaluation was made as C. The comprehensive evaluation was made in the same manner as in Experimental Example 1.

The thick electric wires of Experimental Examples 6-1 and 6-2 were evaluated as A or B in the comprehensive evaluation, which confirmed that these thick electric wires were excellent in flexibility and cost. In contrast, the thick electric wire of Experimental Example 6-3 was evaluated as C in the cost evaluation, and, thus, the comprehensive evaluation was made as C without making an evaluation of either the repulsive force or the conductor adhesive force.

What is claimed is:

1. An electric wire for use in an electric vehicle with a large current of 100 A or more and a high voltage of 30 V or more, comprising:

a conductor; and an electrically insulating layer covering an outer surface of the conductor, wherein the conductor includes first twisted wires in each of which a plurality of element wires are twisted together, and the first twisted wires are twisted together to form one or more second twisted wires, wherein an element-wire diameter of each of the element wires is 0.26 mm to 0.35 mm, wherein a secant modulus of the electrically insulating layer is 15 MPa to 41 MPa, wherein the conductor has a nominal cross-sectional area of 160 SQ, wherein a repulsive force exerted by the electric wire is 200 N or less when the electric wire is bent at a bent portion and when a radius of curvature of the bent portion is changed from 100 mm to 50 mm, and wherein a conductor adhesive force is 30 N or less, the conductor adhesive force being an adhesive force between the conductor and the electrically insulating layer.

2. The electric wire according to claim 1, wherein the conductor includes a third twisted wire in which a plurality of the second twisted wires are twisted together.

3. The electric wire according to claim 1, wherein the electrically insulating layer contains an insulating resin, and the insulating resin includes an ethylene-ethylacrylate copolymer.

4. The electric wire according to claim 3, wherein the ethylene-ethylacrylate copolymer includes more than 10 mass % and less than 35 mass % of ethylacrylate.

5. The electric wire according to claim 3, wherein the insulating resin contains a polyethylene resin, and, when a total content of the ethylene-ethylacrylate copolymer and the polyethylene resin is 100 mass %, a content of the ethylene-ethylacrylate copolymer is more than 20 mass % and less than 90 mass %.

* * * * *